US008176122B2

(12) United States Patent
Smith et al.

(10) Patent No.: US 8,176,122 B2
(45) Date of Patent: *May 8, 2012

(54) WEB-BASED GROUPWARE SYSTEM

(75) Inventors: Gerald William Smith, Stouffville (CA); Charles Edward Tatham, Aurora (CA); Randall Nelson Remme, Bolton (CA)

(73) Assignee: Open Text S.A., Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 12/768,387

(22) Filed: Apr. 27, 2010

(65) Prior Publication Data

US 2010/0287483 A1    Nov. 11, 2010

Related U.S. Application Data

(63) Continuation of application No. 12/037,679, filed on Feb. 26, 2008, now Pat. No. 7,734,694, which is a continuation of application No. 11/044,830, filed on Jan. 26, 2005, now Pat. No. 7,523,162, which is a continuation of application No. 09/590,099, filed on Jun. 9, 2000, now Pat. No. 6,917,962, which is a continuation-in-part of application No. 09/195,905, filed on Nov. 19, 1998, now Pat. No. 6,223,177, which is a continuation-in-part of application No. 08/955,569, filed on Oct. 22, 1997, now abandoned.

(30) Foreign Application Priority Data

Nov. 19, 1997   (CA) .................................... 2221790

(51) Int. Cl.
*G06F 15/16* (2006.01)

(52) U.S. Cl. ....................................... 709/204; 709/205
(58) Field of Classification Search .......... 709/200–205, 709/217–227, 228–229
See application file for complete search history.

(56) References Cited

U.S. PATENT DOCUMENTS

| | | | |
|---|---|---|---|
| 5,107,443 A | 4/1992 | Smith et al. | 715/751 |
| 5,208,912 A | 5/1993 | Nakayama et al. | 709/205 |
| 5,315,711 A | 5/1994 | Barone et al. | 709/208 |

(Continued)

FOREIGN PATENT DOCUMENTS

CA    2 221 026 A    4/1999

(Continued)

OTHER PUBLICATIONS

Backer et al., "DocMan: A Document Management System for Cooperation Support," Proceedings of the 29th Hawaii International Conference on System Science, vol. 3, pp. 82-91, Jan. 1996.

(Continued)

*Primary Examiner* — Moustafa M Meky
(74) *Attorney, Agent, or Firm* — Winston & Strawn LLP

(57) ABSTRACT

The present invention relates to a system and method for providing a communication network. The system comprises a network-connected server having input and access capabilities, a site builder, a transmitter, a communicator, and memory. The site-builder receives instructions input from a first user and creates a dedicated network site based on the received instructions. The transmitter communicates the existence of the dedicated network site to a nominated second user. The communicator provides accesses to the contents of the dedicated network site by the first and second users. The memory stores information input by the first and the second user in the dedicated network site.

20 Claims, 17 Drawing Sheets

U.S. PATENT DOCUMENTS

| | | | |
|---|---|---|---|
| 5,333,152 A | 7/1994 | Wilber | 379/102.04 |
| 5,353,398 A | 10/1994 | Kitahara et al. | 715/759 |
| 5,392,400 A | 2/1995 | Berkowitz et al. | 709/203 |
| 5,432,934 A | 7/1995 | Levin et al. | 726/16 |
| 5,442,788 A | 8/1995 | Bier | 715/751 |
| 5,471,318 A | 11/1995 | Ahuja et al. | 358/400 |
| 5,488,686 A | 1/1996 | Murphy et al. | 715/753 |
| 5,548,506 A | 8/1996 | Srinivasan | 705/8 |
| 5,555,375 A | 9/1996 | Sudama et al. | 709/226 |
| 5,557,726 A | 9/1996 | Yoshizawa | 715/753 |
| 5,572,643 A | 11/1996 | Judson | 709/218 |
| 5,581,702 A | 12/1996 | McArdie et al. | 709/204 |
| 5,606,693 A | 2/1997 | Nilsen et al. | 707/10 |
| 5,649,104 A | 7/1997 | Carleton et al. | 709/204 |
| 5,721,763 A | 2/1998 | Joseph et al. | 379/88.04 |
| 5,724,508 A | 3/1998 | Harple et al. | 709/205 |
| 5,742,768 A | 4/1998 | Gennaro et al. | 709/203 |
| 5,781,909 A | 7/1998 | Logan et al. | 707/200 |
| 5,787,175 A | 7/1998 | Carter | 713/165 |
| 5,790,785 A | 8/1998 | Klug et al. | 726/11 |
| 5,790,790 A | 8/1998 | Smith et al. | 709/206 |
| 5,793,365 A | 8/1998 | Tang et al. | 715/758 |
| 5,793,972 A | 8/1998 | Shane | 709/219 |
| 5,809,242 A | 9/1998 | Shaw et al. | 709/217 |
| 5,815,657 A | 9/1998 | Williams et al. | 705/1 |
| 5,822,525 A | 10/1998 | Tafoya et al. | 709/204 |
| 5,826,265 A | 10/1998 | Van Huben et al. | 707/8 |
| 5,845,067 A | 12/1998 | Porter et al. | 726/4 |
| 5,848,412 A | 12/1998 | Rowland et al. | 707/9 |
| 5,859,974 A | 1/1999 | McArdle et al. | 709/204 |
| 5,861,883 A | 1/1999 | Cuomo et al. | 715/733 |
| 5,867,653 A | 2/1999 | Aras et al. | 709/204 |
| 5,884,032 A | 3/1999 | Bateman et al. | 709/204 |
| 5,889,945 A | 3/1999 | Porter et al. | 709/204 |
| 5,889,952 A | 3/1999 | Hunnicutt et al. | 709/219 |
| 5,892,905 A | 4/1999 | Brandt et al. | 726/11 |
| 5,940,082 A | 8/1999 | Brinegar et al. | 345/442 |
| 5,940,834 A | 8/1999 | Pinard et al. | 707/102 |
| 5,974,446 A | 10/1999 | Sonnenreich et al. | 709/204 |
| 5,987,140 A | 11/1999 | Rowney et al. | 705/79 |
| 5,991,810 A | 11/1999 | Shapiro et al. | 709/229 |
| 5,996,003 A | 11/1999 | Namikata et al. | 709/205 |
| 6,026,433 A | 2/2000 | D'Arlach et al. | 709/217 |
| 6,052,785 A | 4/2000 | Lin et al. | 726/5 |
| 6,057,841 A | 5/2000 | Thurlow et al. | 707/500 |
| 6,073,142 A | 6/2000 | Geiger et al. | 707/500 |
| 6,085,192 A | 7/2000 | Mendez et al. | 707/10 |
| 6,085,324 A | 7/2000 | Ogram | 726/5 |
| 6,115,709 A | 9/2000 | Gilmour et al. | 707/9 |
| 6,167,432 A | 12/2000 | Jiang | 709/204 |
| 6,175,842 B1 | 1/2001 | Kirk et al. | 715/513 |
| 6,182,273 B1 | 1/2001 | Tarumi | 717/101 |
| 6,185,603 B1 | 2/2001 | Henderson et al. | 709/206 |
| 6,199,116 B1 | 3/2001 | May et al. | 719/310 |
| 6,223,177 B1 | 4/2001 | Tatham et al. | 707/9 |
| 6,233,600 B1 | 5/2001 | Salas et al. | 709/201 |
| 6,240,444 B1 | 5/2001 | Fin et al. | 709/205 |
| 6,286,034 B1 | 9/2001 | Sato et al. | 709/204 |
| 6,292,830 B1 | 9/2001 | Taylor et al. | 709/224 |
| 6,563,914 B2 | 5/2003 | Sammon et al. | 379/202.01 |
| 6,662,210 B1 | 12/2003 | Carleton et al. | 709/204 |
| 7,031,954 B1 | 4/2006 | Kirsch | 707/3 |
| 7,320,018 B2 * | 1/2008 | Cannata et al. | 709/204 |

FOREIGN PATENT DOCUMENTS

EP      0 616 448 A2      9/1994

OTHER PUBLICATIONS

Bentley et al., "Designing a system for cooperative work on the World-Wide Web: Experiences with the BSCW System," Proceedings of the 30th Hawaii International Conference on System Sciences: Information Systems Track—Internet and the Digital Economy, vol. 4, pp. 297, Jan. 1997.

Bentley et al., "Supporting Collaborative Information Sharing with the World Wide Web: The BSCW Shared Workspace System," The World Wide Web Journal: Proceedings of the 4th International WWW Conference, Issue 1, pp. 63-74, Dec. 1995.

Bentley et al., "The Architecture of the BSCW Shared Workspace System," Proceedings of the ERCIM Workshop on CSCW and the Web, Sankt Augustin, Germany, Feb. 1996.

Child, Don, "How does Lotus Notes Work with the Internet?," Chapter 3, Lotus Notes and Domino Server 4.5, Sams Publishing, pp. 51-61 (1997).

Child, Don, "Using the Notes Client on the Internet," Chapter 23, Lotus Notes and Domino Server 4.5, Sams Publishing, pp. 562-578 (1997).

Fredell, Thomas L., "Developing Web Applications with Domino Action," Chapter 25, Lotus Notes and Domino Server 4.5, Sams Publishing, pp. 606-628 (1997).

Hiltuneni et al., "Access Control in Wide-Area Networks," Proceedings of the 17th International Conference on Distributed Computing Systems, pp. 330-337, May 1997.

Wunderlich, Rob, "Connecting Notes to the Internet with InterNotes," Chapter 26, Lotus Notes and Domino Server 4.5, Sams Publishing, pp. 630-697 (1997).

Yavatkar et al., "Clique: A Toolkit for Group Communication using IP Multicast," Proceedings of the First International Workgroup on Service in Distributed and Networked Environments, pp. 132-138, Jun. 1994.

BSCW User Manual, BSCW Project, GMD-FIT, Version 2.0, Sankt Augustin, Germany, Jun. 1996.

The Sourceforge Crew, <admin@sourceforge.net>: "SourceForge, version 1.1.0" http://sourceforge.net, May 4, 2000, Internet; the whole software program & Open Source Development Network: "[fmll]—Project details for SourceForge" Freshmeat.Net, [Online], Oct. 15, 2001, XP002180271 Internet; Retrieved from the Internet: <url:http://freshmeat.net/projects/sourceforge/> [retrieved on Oct. 15, 2001] p. 1, lines 1-8; p. 2, lines 5-6.

* cited by examiner

WEB-BASED GROUPWARE SYSTEM

CROSS-REFERENCE TO RELATED APPLICATIONS

This application is a continuation of U.S. application Ser. No. 12/037,679, filed Feb. 26, 2008, now U.S. Pat. No. 7,734,694 which is a continuation of U.S. application Ser. No. 11/044,830, filed Jan. 26, 2005, now U.S. Pat. No. 7,523,162, which is a continuation of U.S. application Ser. No. 09/590,099 filed Jun. 9, 2000, now U.S. Pat. No. 6,917,962, which is a continuation-in-part of U.S. application Ser. No. 09/195,905 filed Nov. 19, 1998, now U.S. Pat. No. 6,223,177, which is a continuation-in-part of U.S. application Ser. No. 08/955,569 filed Oct. 22, 1997, now abandoned, and which claims priority to Canadian Patent Application Serial No. 2,221,790 filed on Nov. 19, 1997, the contents of which are expressly incorporated by reference herein in their entirety.

FIELD OF THE INVENTION

The present invention relates to the field of collaborative software systems. More specifically, the invention relates to a system and method for providing network-based groupware functionality.

BACKGROUND OF THE INVENTION

Recently, the need for collaborative computing environments has been receiving increasing attention. People are finding that it is more and more important to share information and work together to meet common goals. With increasing specialization in the marketplace, there is frequent need to work together with people from different offices, different organizations and even different countries to satisfy the requirements of a particular project or goal. Managing collaborative initiatives of this type is not a simple matter.

Electronic network based, project management server systems are known. For example, U.S. Pat. No. 5,548,506 [Srinivasan] discloses an automated, electronic network based, project management server system for managing multiple work groups. The system comprises a core piece of software which runs on a host server computer system and interacts with a messaging system such as E-mail or facsimile. The system compiles multi-project plans into a multi-project database and tracks the ownership of projects, tasks and resources within the plans. The system automatically checks all resource requests and if resource availability limits are exceeded then resources are allocated on projects based on priorities and project plans are changed accordingly. The system is also programmed to send out reminders and follow-ups and the databases are continuously updated based on status changes reported by work group members.

One of the disadvantages of known electronic network-based, collaborative server systems is that they depend on Information Technology specialists or a system administrator to administer control of the system, i.e., if a user wishes to add functionality to a system, they must have access to the program itself. Further, many collaborative systems require each user to have specialized software installed on their computer.

It is an object of the present invention to obviate and mitigate at least one of the disadvantages of the prior art.

SUMMARY OF THE INVENTION

Accordingly, in one of its aspects, the present invention provides a system for providing a communication system, the system comprising:

(i) a network-connected server having input and access capabilities;
(ii) a site-builder for receiving instructions input from a first user and for creating a dedicated network site based on said received instructions;
(iii) a transmitter for communicating existence of said dedicated network site to a nominated second user;
(iv) a communicator for accessing contents of said dedicated network site by said first and said second users; and
(v) memory for storing information input by said first and said second user at said dedicated network site.

In another aspect the present invention provides a system to provide a team of users with intranet-based groupware functionality, comprising:

(i) a network-connected server capable of receiving an initiate instruction from a primary user;
(ii) a site builder for creating a dedicated site on said server in response to said initiate instruction;
(iii) a transmitter for sending information about the existence of said dedicated site to at least one secondary user nominated by said primary user;
(iv) a communicator for transmitting information between said dedicated site, said primary user and said at least one secondary user;
(v) memory for storing information at said dedicated site, said information from said primary and said at least one secondary user;
(vi) a processor for processing said information stored at said dedicated site said processed information being transmitted by said communicator to said primary user and said at least one secondary user.

In yet another aspect, the present invention provides a method for providing a communication network, comprising:

(i) providing an network-connected server having upload and download capabilities;
(ii) receiving instructions uploaded from a first user and for creating a dedicated network site on said server, said dedicated network site having a unique name based on instructions received;
(iii) communicating the existence of said dedicated intranet site to a nominated second user;
(iv) downloading contents of said dedicated network site to said first and second users;
(v) storing information in the dedicated web-site.

In yet another aspect, the present invention provides a computer configured to operate a groupware application program, the computer comprising:

(i) a network for connecting to at least a primary and a secondary user;
(ii) a site builder for receiving instructions input from said primary user and for creating a dedicated site within the computer based on said instructions;
(iii) a mailer for looking up an address of said secondary user from an address database;
(iv) a communicator for communicating the existence of said dedicated site to said secondary user;
(v) memory for storing information at said dedicated site at the request of the primary and the secondary user; and
(vi) a processor for processing said stored information at the request of the primary and the secondary user.

In yet another aspect, the present invention provides a data carrier having thereon a computer program for performing the steps of:

(i) facilitating communication between a server, a primary user and a secondary user;

(ii) creating a dedicated site within the server based on instructions input from the primary user;
(iii) looking up address of the secondary user from an address database;
(iv) communicating the existence of the dedicated site to the secondary user;
(v) storing information at the dedicated site at the request of the primary and the secondary user; and
(vi) processing the stored information at the request of the primary and the secondary user.

BRIEF DESCRIPTION OF THE DRAWINGS

An embodiment of the present invention will be described, by way of example only, with reference to the accompanying drawings, in which.

DETAILED DESCRIPTION OF THE PREFERRED EMBODIMENT

Figure 1:
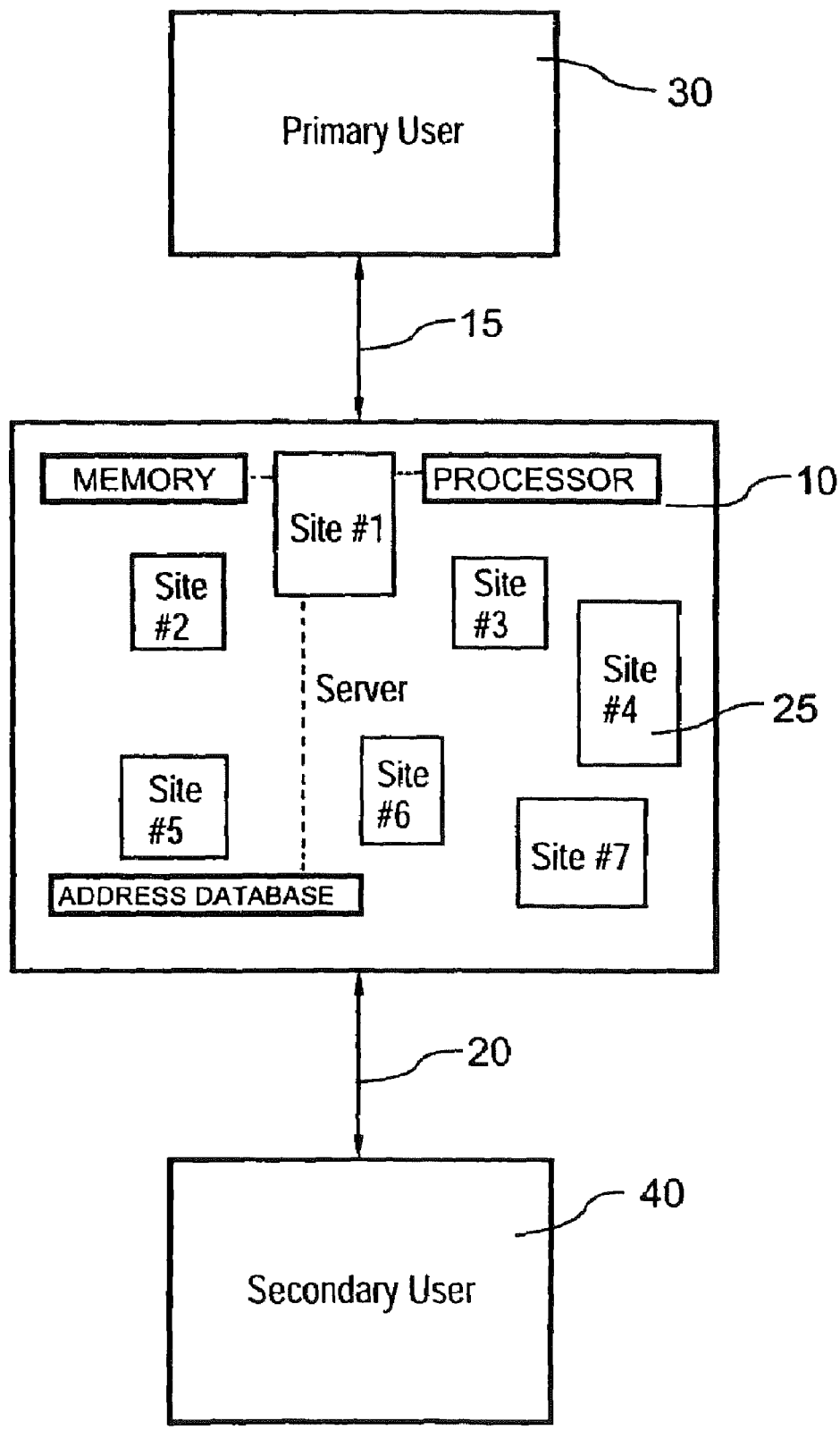
FIG. 1 is a schematic representation of a system in accordance with one embodiment of the present invention.

A system to provide a team of users with intranet-based groupware functionality in accordance with an embodiment of the present invention is shown schematically in FIG. 1.

The system generally comprises at least one server computer as an intranet connected server 10 which supports a TCP/IP protocol and which has input and access capabilities via two-way communication lines, such as communication lines 15 and 20. The computer is configured as a web server. Server 10 has a unique resource locator (URL) address and comprises a means to create a dedicated intranet site 25 (e.g. Site #4) on the server in response to an initiate request received from a primary user 30. Dedicated site 25 has a unique address which identifies it with the primary user 30 (e.g., #4) within server 10. Server 10 further comprises a means to send information, including its URL address and the unique address of the dedicated site, to at least one secondary user 40, nominated by the primary user 30.

Both primary user 30 and secondary user 40 can communicate with server 10 by means of an HTML compliant client supporting a graphical user interface and internet browser, such as Netscape Navigator™ or Microsoft Explorer™, i.e., there is no requirement that either primary user 30 or secondary user 40 have access to specialized software applications in order to utilize the system of the present invention. Information on the site 25 is credited as a hypertext document and is thus displayed as a web page on the GVI of the user's web browser, with a link to this hypertext document.

Once connected to dedicated site 25 created on server 10, primary user 30 and secondary user 40 both have access to at least some of the information stored at the site, the ability to access and process at least some of the information and the ability to input and store processed and/or new information. All the specialized software which provides the functional requirements to give primary user 30 and secondary user 40 these abilities is provided by server 10 via dedicated site 25. Once again, primary user 30 and secondary user 40 do not require any specialized software applications other than a standard internet browser.

Server 10 may be provided a number of general sites (e.g., Sites #1, #2, #3) which are automatically accessible to primary user 30 and secondary user 40; other sites (e.g., Site #6) which are accessible to only one of the users; and some sites (e.g., Site #7) which can only be accessed by a system administrator (not shown). The nature and purpose of these different sites will be described in more detail below.

It will be apparent that although the system of the present invention is primarily intranet-based, the nature of communication lines, such as line 15 between server 10 and primary user 30, is not particularly limited. An intranet is simply defined by its security parameters for the connected users. Suitable intranet-adaptable communication lines include dedicated lines, public telephone networks, private telephone networks, satellite links, Ethernet links, etc. These communication lines are already in place if primary user 30 and secondary user 40 have existing intranet access.

It is envisioned that server 10 may be connected to the internet as well as an intranet. A suitable firewall (not shown) may be provided between the intranet and external or intranet users. As will also be apparent in this embodiment, the geographic locations of primary user 30, secondary user 40 and server 10 are only limited by internet accessibility, i.e., all three need not be in the same city, county or even continent.

The dedicated site created in response to the initiate request can be thought of as being a private office suite within the semi-public intranet.

The private office suite may be created on the server for a period of time desired by the primary user, after which time the private suite can be erased to free-up system resources. The private office suite comes complete with all the application software required to permit group activity within the office. The primary user can construct a private office suite to include the specific applications desired. Thus, an advantage of the present system is that the user is provided with a customizable, secure office suite in which the user and his/her team members can access applications software without the need for each team member to have individual copies of each applications software.

The system of the present invention is "end-user friendly", i.e., neither primary user 30 nor secondary user 40 need specialist computer knowledge to make use of the system. There is no requirement for the primary user to have an in-house Information Technology specialist.

Figure 2:
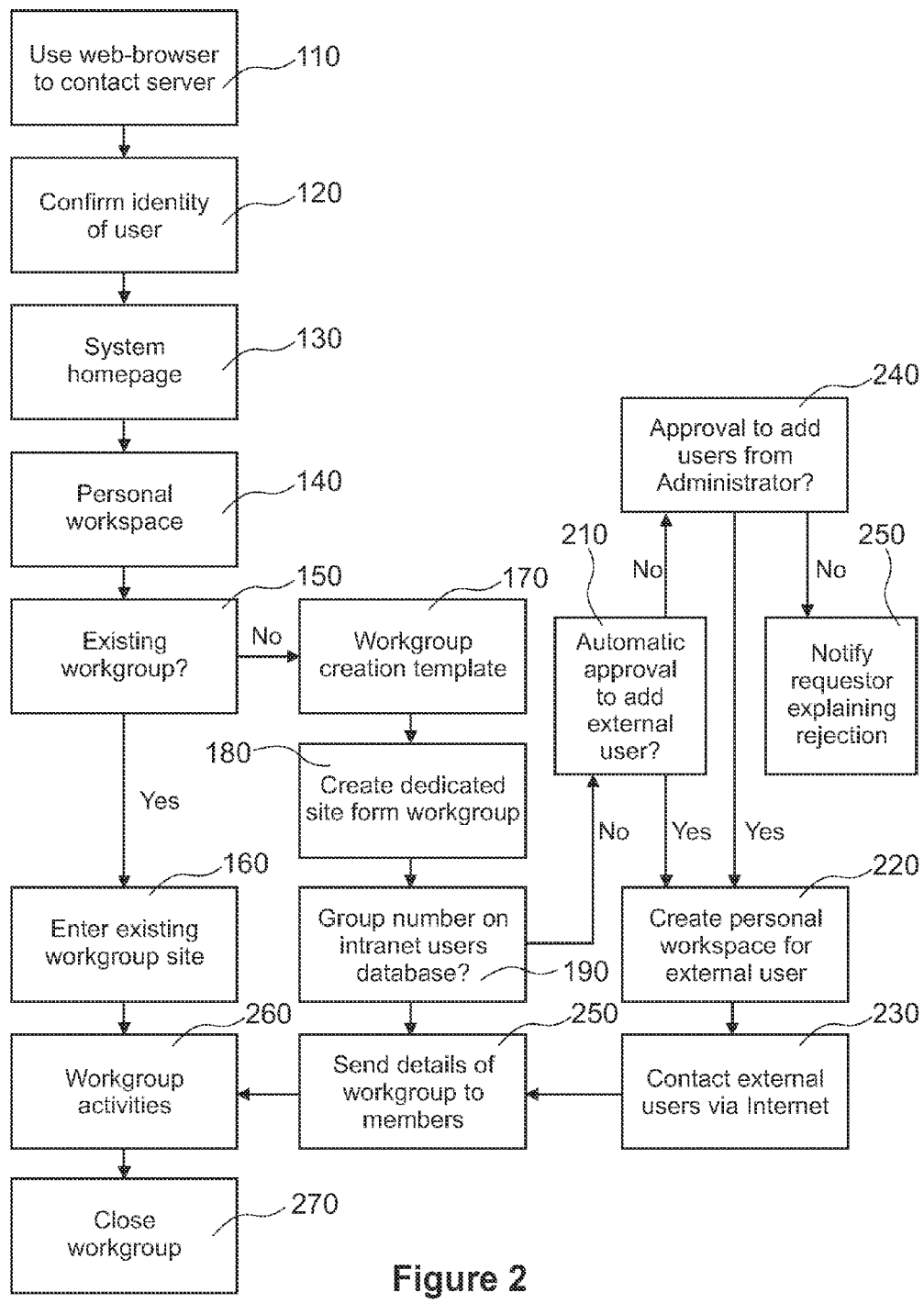
FIG. 2 is a flowchart outlining the operation of the system.

The system of the present invention is further understood when described by its mode of operation and with reference to FIG. 2.

In order to create a private office suite, a primary user uses his/her web browser 110 to contact the intranet connected server. The server confirms the identity 120 of the primary user and directs the primary user to the system homepage 130. From the system homepage, the primary user can access his/her personal workspace 140.

Among other options which will be discussed below, the primary user has the option to enter an existing workgroup with a pre-defined dedicated site or to create a new workgroup with a new, unique dedicated site (150).

If the primary user wishes to enter an existing workgroup the server permits access to the pre-defined site (160).

If the primary user wishes to create new workgroup, he/she is provided with a workgroup creation template (170) which permits the primary user to define parameters of the workgroup, such as the name of the workgroup and the site to be created, the scope of the project being undertaken, the number of team members, etc.

During completion of the template, the primary user is prompted to identify the number and contact addresses of the group members, the types of user applications which are to be utilized during the project and to provide a name for the dedicated site to be created.

Once this template has been completed, the server creates a dedicated site (180) having the name chosen by primary user. The administration sub-system checks to see whether all the prospective group members identified by the primary user are listed on the existing intranet-user database (190). If a prospective group member is an existing intranet user, the server then sends details of the newly created dedicated site to that member of the group (secondary user) (200). in a presently preferred embodiment, the server automatically creates a link between each secondary user's personal workspace and the newly created dedicated site. Alternatively, the details of the web-site may be sent in the form of an E-mail message which provides each secondary user with the address of the dedicated site, an invitation to join the workgroup and, if applicable, the password required for gaining access to the site (see later).

If a prospective group member is not an existing intranet user, the administration sub-system determines whether the primary user has the authority to add external users (210). If the primary user does have authority to add external users, the server creates a personal workspace for that user (220) and notifies the external user of the existence of the workgroup (230). Preferably, the notification is done by means of E-mail, although other means, such as facsimile or pager, may also be used. Once authorized, an external user can contact the server via the internet and the external user has access to the same operational functionality as an intranet-connected user.

If the primary user does not have authority to add external users, a request is sent to a designated system administrator who makes the determination whether the external user can be added to the new workgroup (240). If approval is given, the system creates a personal workspace for the external user as before (220), if the addition of the external user is not approved, the primary user (requestor) is advised (250).

Once the approved secondary users have been notified of the existence of the dedicated site, the workgroup remains operational until all workgroup activities have been completed (260). When the primary user decides that there is no longer a requirement for the workgroup, the workgroup is closed (270) and the dedicated site may be deleted from the server. Prior to closure and deletion of the dedicated site, primary user may be given the option of downloading and storing all the data from the site for archive purposes.

During the creation of a dedicated site, secondary user nomination, workgroup activity, closure of the workgroup and eventual deletion of the site, all the administrative details of the workgroup activity are automatically fed into the administrative sub-system for processing. The administration sub-system controls all the day to day management of the system. It contains all the code and script required for workgroup size monitoring and database size monitoring. Further, the administration sub-system is responsible for monitoring server traffic and hit counts and the control of the offering of additional subscriber applications.

Security is an important feature of most business activity and the system of the present invention provides many levels of security which can be selected by the primary user and/or system administrator to suit his/her individual needs. For example, a basic form of security is to provide the dedicated site created with a password which must be entered by both the primary user and the secondary users to gain access to the workgroup. This password may be the same for the primary user and all the secondary users or every secondary user may be provided with a unique password. Providing each secondary user with a unique password also permits primary user to set up different levels of information which can be accessed within the workgroup by each secondary user, i.e., the workgroup can be created on a "need to know" basis. Examples of other security features include the ability of the primary user to decide: who has the authority to add new secondary users to and/or delete existing secondary users from the group after its creation; who has access to the administrative records of the workgroup; and when and if passwords and/or security levels are to be changed.

As will be apparent, there are many different types of workgroup activities which can be performed on a system in accordance with the present invention. In fact, it is envisioned that the present system could be adapted to perform many of the tasks of conventional LAN- or WAN-based group collaboration systems. Preferred workgroup activity applications of the present system include bulletin board, chat room, calendar, contact database, change control, event planner, group discussion, issue management, project collaboration, presentation library, decision survey in a box, NGS proposal development, document manager, and Your Own Custom Application.

A bulletin board is a common place for team members to post anything that might be of interest to the team. Discussion, file attachments, and broadcast mail are available. Additionally, a number of views may be utilized to gain access to the information, including by date, by author, by type, etc.

A chat room is a real-time chat function for teams to schedule discussions on the fly.

A calendar is a central calendar dedicated to the team, where individuals may add entries to keep track of milestones, issues and events. It is presented in a dynamic view, i.e., 2 day, one week, two weeks or one month.

A contact database is an application that allows groups to track specific contracts in a central place. The views allow sorting by name, company type, etc.

A change control is a workflow application that allows teams to request and manage project changes.

An event planner is an application that is targeted at managing the deliverables for an upcoming event. Team members can assign tasks and milestones, broadcast mail to the stakeholders, and view a calendar in a number of formats.

The group discussion is a complete collaborative application that offers groups a central meeting place for the exchange of ideas.

Issue management is a workflow application that allows project teams to report issues, notify the owners, and track the resolution.

Project collaboration is a complete project management tool that provides managers and team members a Web sit environment for creating, implementing and managing projects. Involv Project Collaboration also imports and exports Microsoft Project Plans.

Presentation Library is an application similar to document management but specific to storing presentation files for sales and marketing use. File attachments, descriptions and a variety of views make accessing information easier.

The Decision Survey in a Box is a survey application created by Emerging Technology Solutions for Involv Intranet, Decision Survey allows for instant creation of surveys for publishing and gathering data from groups on the Intranet or extranet.

NGS Proposal Development is a workflow application created by Nexgen Solutions for Involv Intranet. This application allows all stakeholders in the proposal development process to come together with content quickly and effectively.

Document Manager is a central depository for posting and managing files and documents of all types. Check in/Check out and decision history makes this a powerful team tool.

Your Own Custom Application is a Domino application that can be offered through the Involv Intranet Desktop for self-service.

An embodiment of the system of the present invention is shown in FIGS. 3a-3e. All the display screens of the system exemplified in FIGS. 3a-3e have the appearance of a personal organizer, with an index "page" (300) on the left-hand side and a details "page" (310) on the right-hand side. The index page is tabbed (320a-320d) for convenient organization and ease of use. As will be apparent, the style of screen display is not limited to this personal organizer style of display. Screen displays can be customized to a user's preference.

Figure 3A:
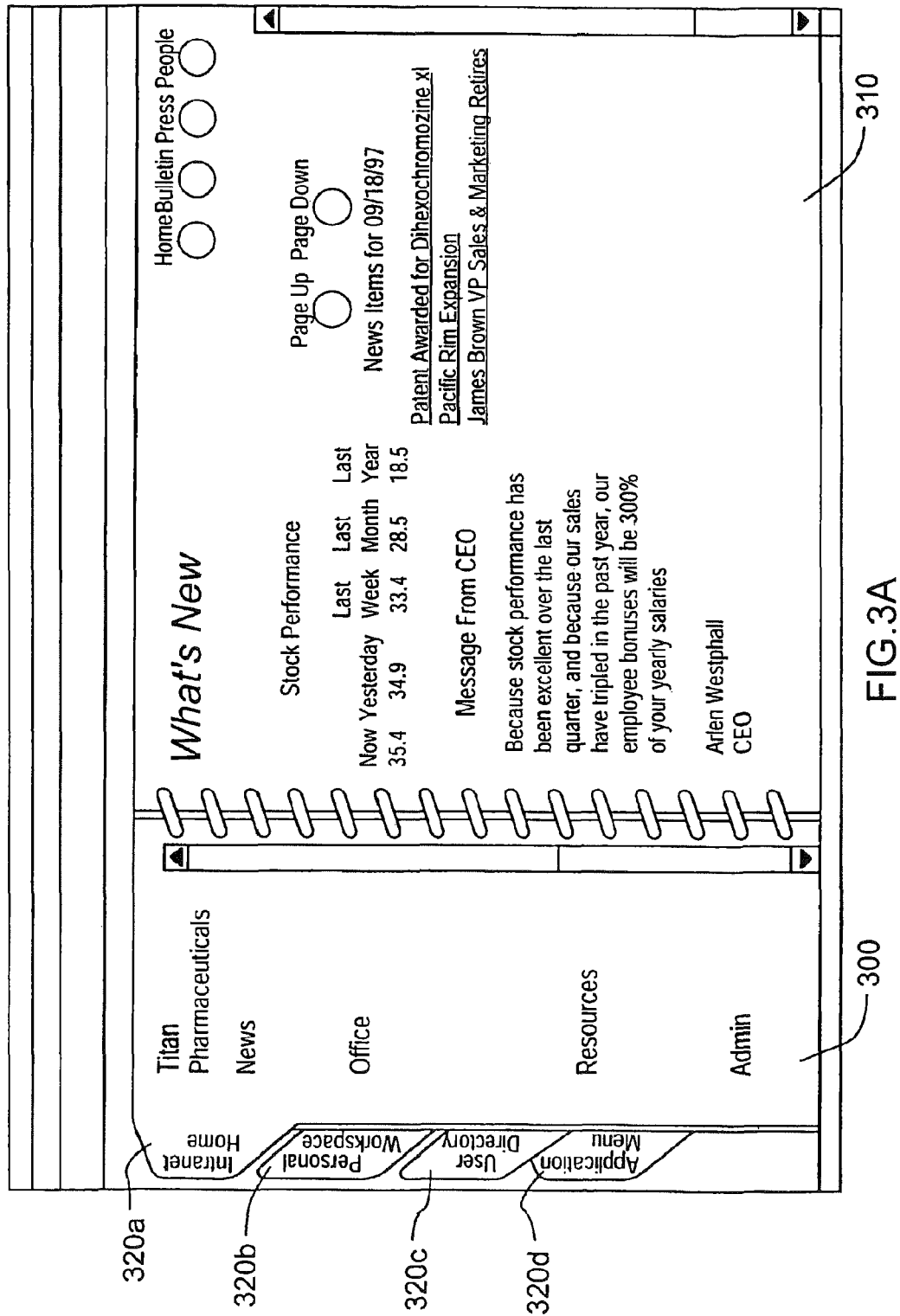
FIGS. 3a-3e are reproductions of user screens from a communication network created in accordance with the present invention.

FIG. 3a shows a system homepage (130) as would be seen by a user upon accessing the system. The system homepage may be used to provide links to general access features such as news, library resources, phone directories, office procedure manuals, etc. From the system homepage, a user can also tab to their own personal workspace (320b).

Figure 3B:
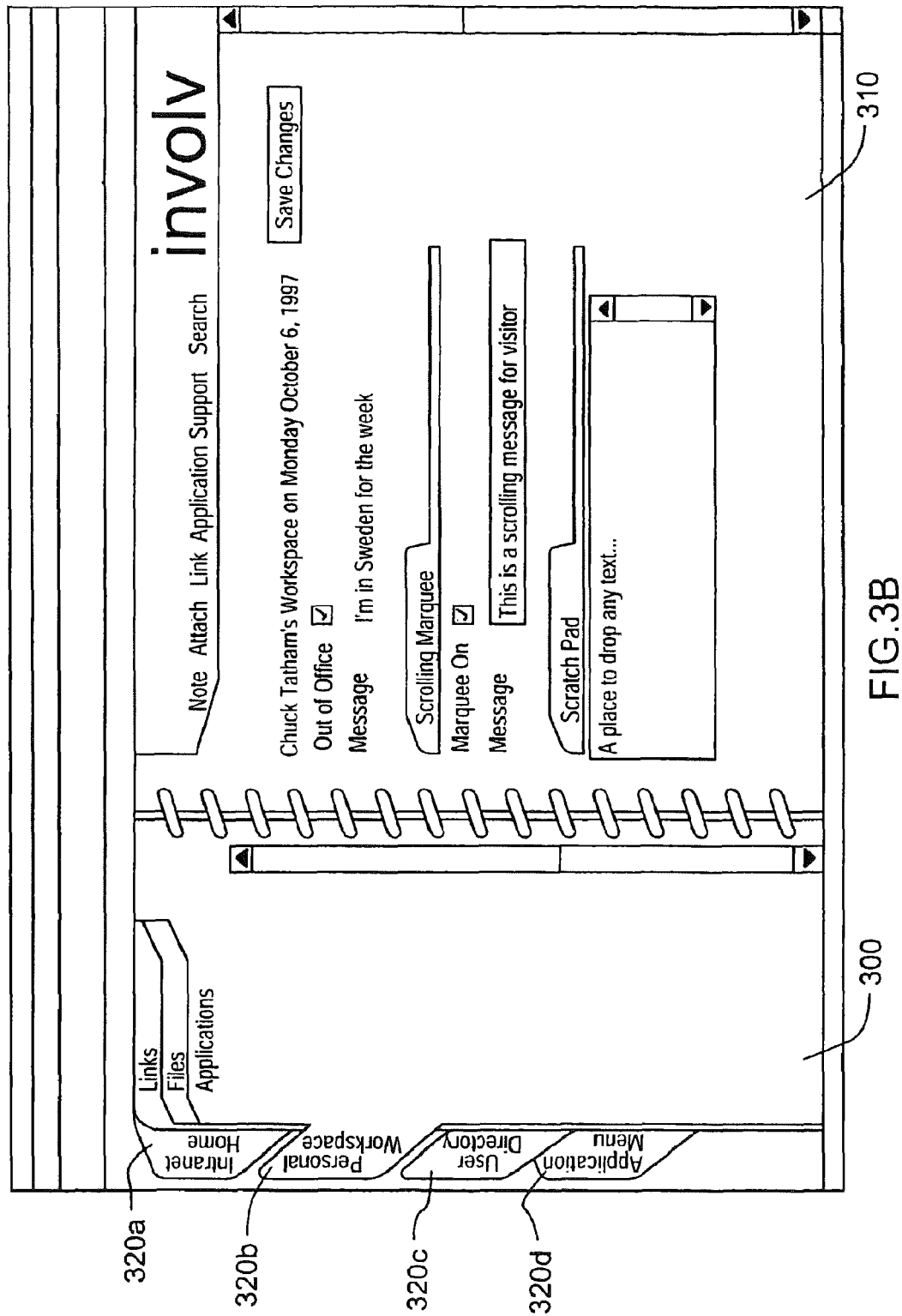

FIG. 3b shows a typical personal workspace as seen by the owner. The index page provides links to the dedicated sites to which the owner has access and also to some generic' applications such a personal messaging, chat groups and E-mail.

Figure 3C:
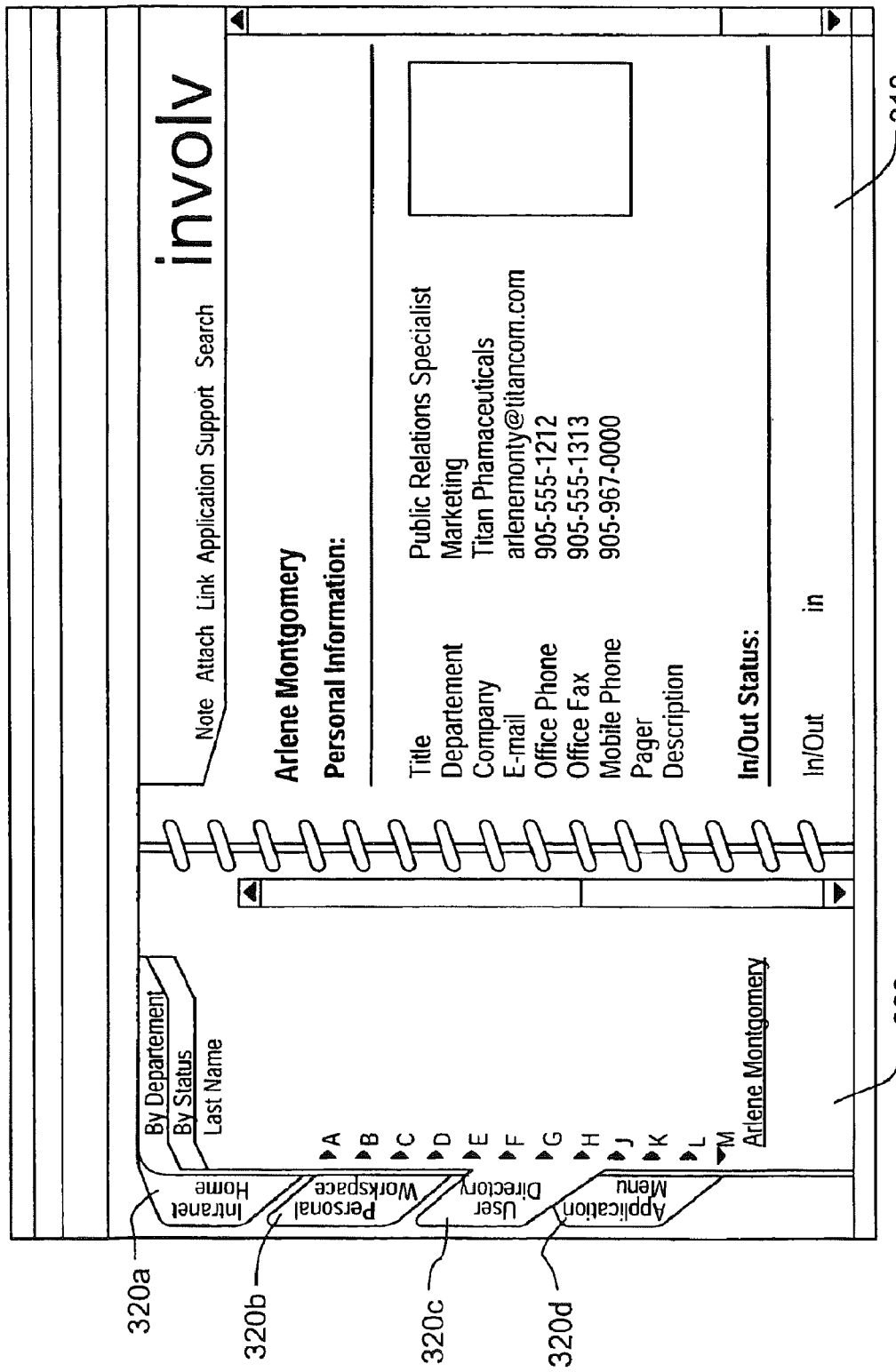

FIG. 3c shows a typical personal workspace as seen by a visitor. This level of a personal workspace may be accessed to any intranet user or authorized external user via the user's directory (Tab 320c). In this instance, index page 300 provides links to other users, not to the person's personal dedicated sites. The details page provides information on, for example, contacting the users, the users' specialty and the user's present availability.

Figure 3D:
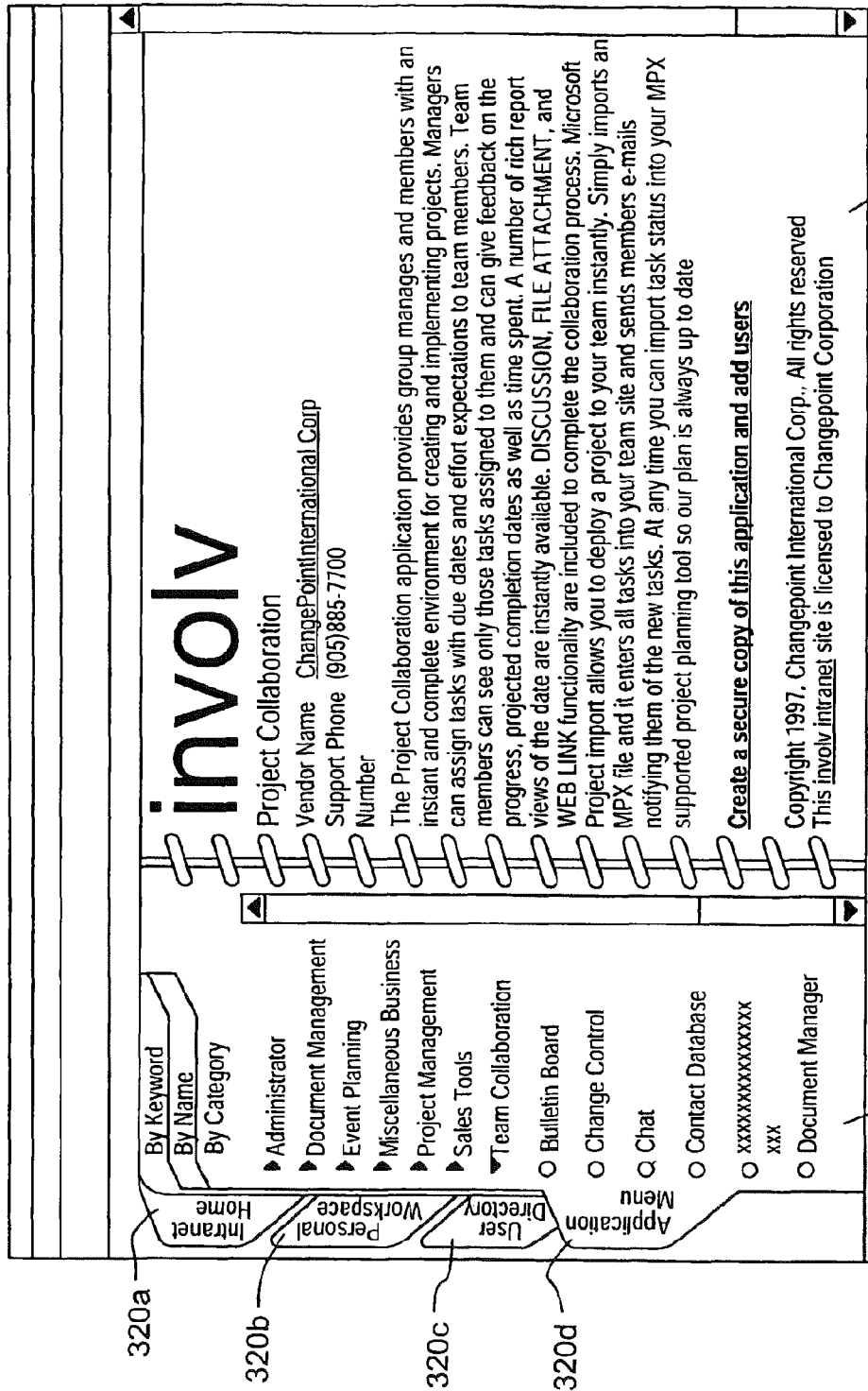
Figure 3E:
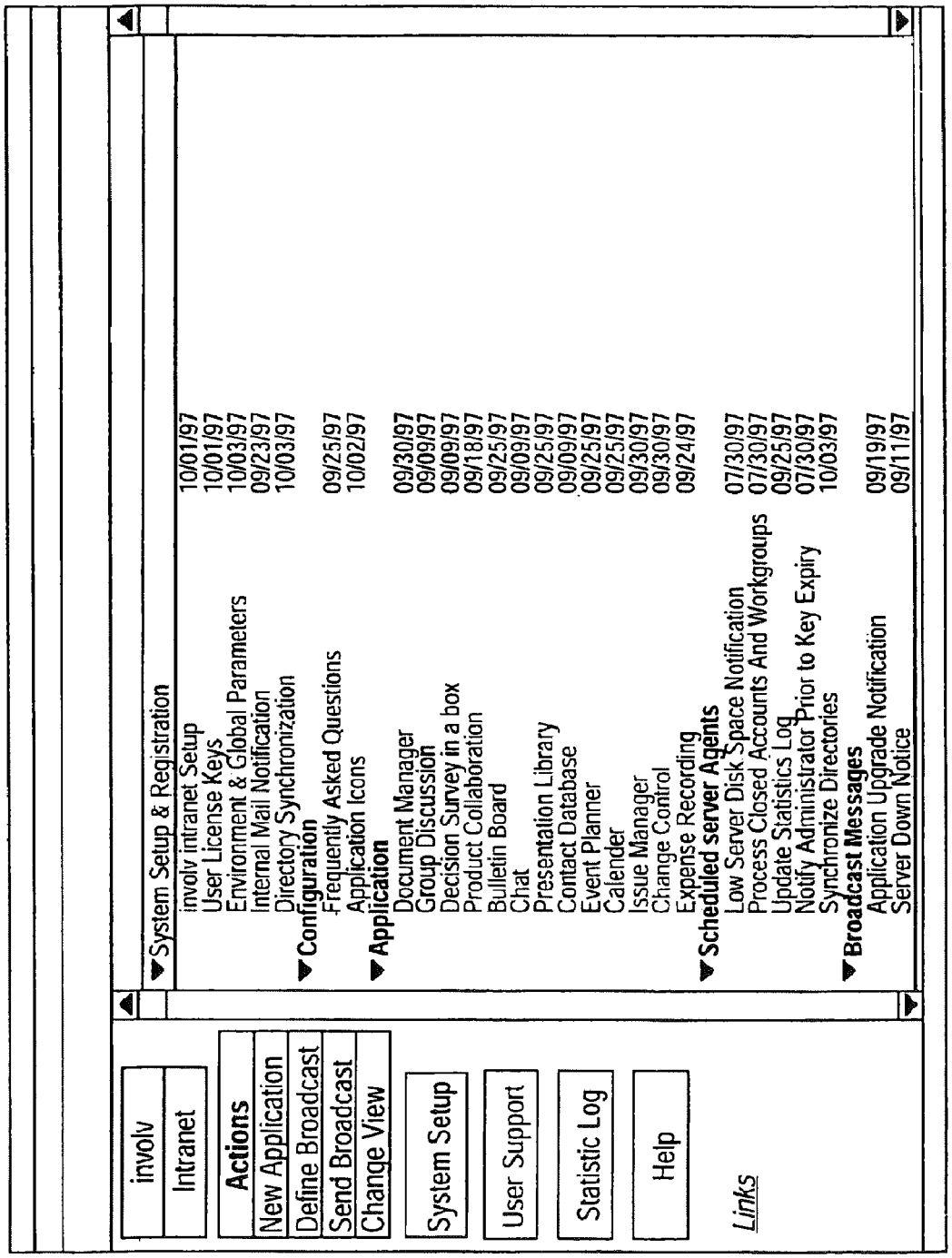

FIG. 3d shows an application menu (Tab 320d) which can be utilized by a user to create dedicated sites and add users to a workgroup. Different styles of sites can be created, depending on the function of the site, e.g., Project Collaboration, Event Planning, Document Managing, etc. The details page can be used to give a user an overview of each type of workgroup and provide a link to a template for creating the group. If a user creates a workgroup having a dedicated site, a link to that site is automatically created on the index page 300 of a nominated secondary user's personal workspace (FIG. 3b).

A further embodiment of the system described above is detailed below. The application relates to communication between a financial advisor (advisor) and a client, or group of clients. There are currently many trading web sites on the Internet (such as E*Trade™, Ameritrade™ and the like) where an individual, or client, can trade without going through an intermediary such as an advisor. Trading through these web sites is significantly less expensive than trading though the advisor.

It is argued that the expertise of the advisor is beneficial to the client and will provide the client with a larger profit despite the higher commissions. Advisors are trained to provide investment advice and have more experience and easier access to a larger volume of resources than does a typical client. Furthermore, since most clients do not have the time or tools to watch the securities markets all day, it is possible that they may miss the best opportunity to make changes in their financial position. An advisor is typically in a better position to make decisions as events happen.

However, since conditions on the securities markets can change very rapidly, the advisor currently needs to make a decision about which clients should learn of the new conditions. Most likely, the advisor will first inform the relevant high net-worth clients by telephone. Lower net-worth clients are normally not notified as quickly, if at all, although they represent the greater number of clients. It is typically these lower net-worth clients who are gravitating towards to the low commission trading web sites in order to save money for effectively the same amount of service.

Figure 4:
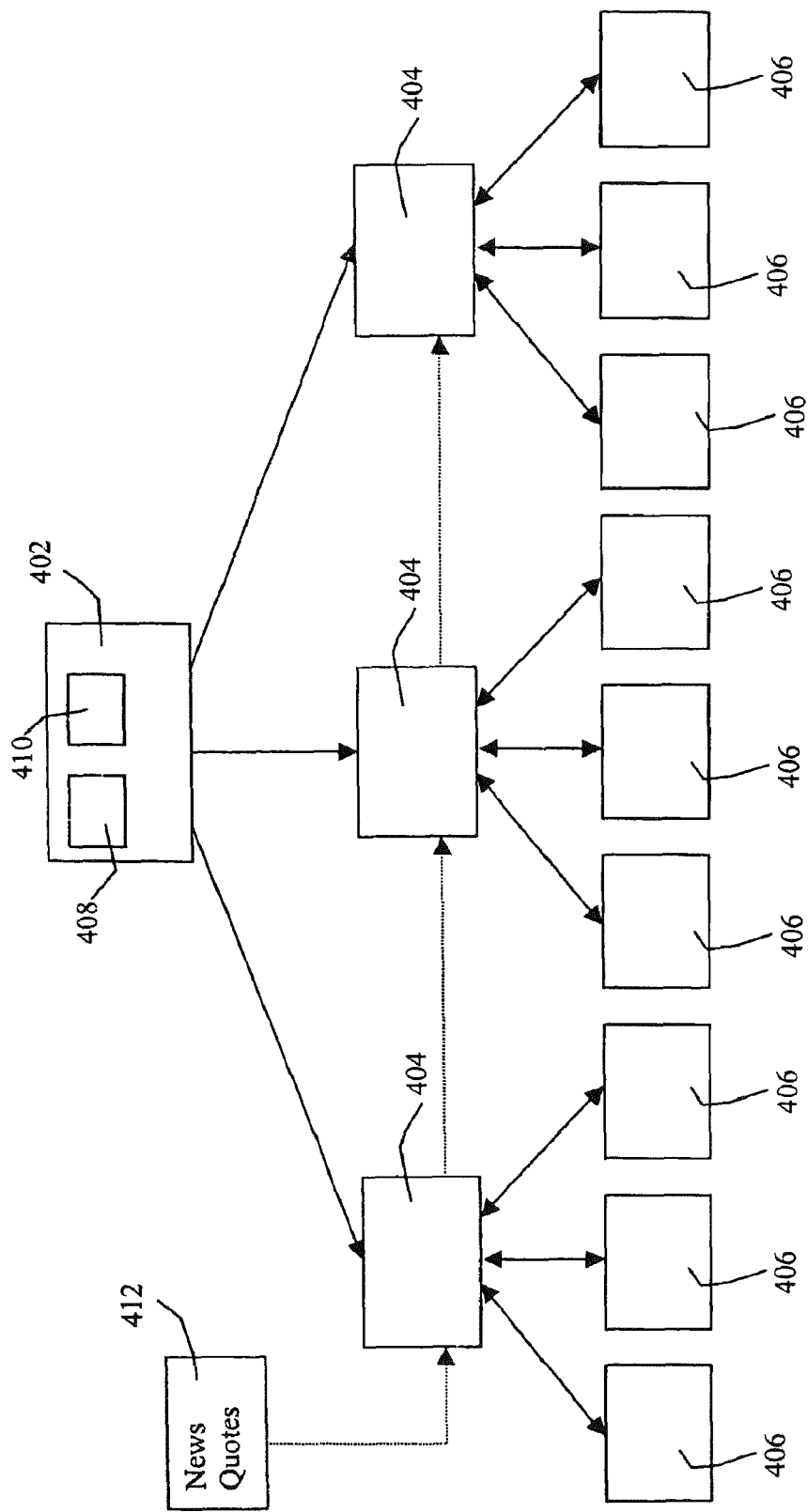
FIG. 4 is a block diagram of the system according to an embodiment of the invention.

Accordingly, the advisor is provided with a system for consolidating information and for providing relevant information to a client or group of clients. FIG. 4 illustrates such a system, which is represented generally by the numeral 400. The system includes a three-tiered hierarchy including a brokerage 402, a plurality of advisors 404 associated with the brokerage 402, and a plurality of clients 406 associated with each advisor 404.

Each of the members of the hierarchy can communicate with each other in a manner that is determined by the business relationship between them. For example, the brokerage 402 can communicate with any of the advisors 404 and any of the clients 406. The advisors 404 can communicate with the brokerage 402 and their associated clients 406. The clients 406 can communicate with the brokerage 402 and their advisor 404, but not other clients 406. Alternately, it is possible for an advisor 404 to communicate with any client 406 (not shown), and for an advisor 404 to communicate with other advisors 404 (not shown). A person skilled in the art will appreciate various relationships between members of the hierarchy.

The brokerage 402 typically includes a research department 408 and a marketing department 410. The marketing department 410 is typically responsible for providing to the clients and advisors brokerage-related information such as recommendations, upcoming events, RRSP calculators, and the like. The research department 408 is responsible for providing information that might benefit the clients 406 such as investment trends, mergers and acquisitions, mineral deposit discoveries, and the like. Generally this information is forwarded to the advisors 404, who in turn selectively forward it to the clients 406. Furthermore, data streams 412 providing headline news, stock quotes, and other external data sources are provided for the advisors 404 and clients 406. In some cases, the advisors 404 may also selectively forward such information to their clients 406.

The advisor 404 selectively forwards information to associated clients 406, by either sending to client groups or by choosing clients directly as recipients. The groups are previously created using predetermined criteria such as areas of interest and the like. When the advisor receives a piece of information relating to a specific industry, the advisor forwards it to the corresponding client or client group.

The network used to facilitate the above mentioned hierarchy is described as follows. The system is stored and run from a computer server that is coupled to the World Wide Web (WWW). The server is provided with security measures, which are well known in the art, to prevent intruders from gaining access to client information. Each of the brokerage, advisors, and clients can access the system using a web-browser such as Netscape™ or Internet Explorer™. If the server is located at a remote location, then the brokerage, advisors, and clients can each access the system via the Internet using a personal computer, personal digital assistant, mobile telephone, and the like. Alternately, if the server is located at the brokerage, the brokerage and the advisor may be connected via the Intranet as well as having Internet access. Such network access is known and modifications will be apparent to a person skilled in the art.

Figure 5:
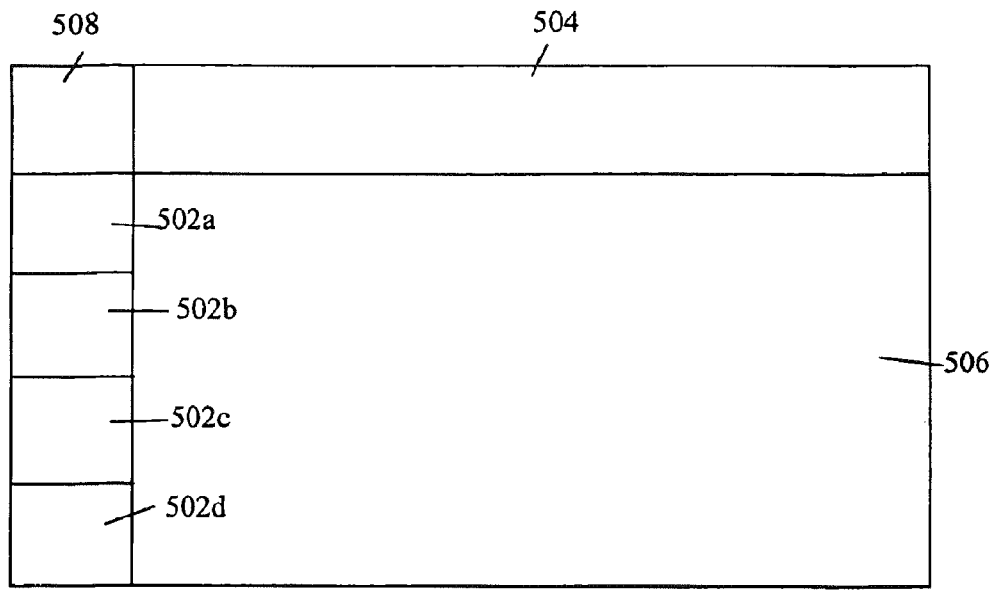
FIG. 5 is a block diagram of an advisor graphical user interface.

The advisor navigates to a web site provided by the system and logs in. Upon logging in, the advisor is presented with a web page. Referring to FIG. 5, a block drawing representing the web page is illustrated generally by the numeral 500. The web page is displayed in a frames format, wherein different portions of a screen contain different web pages. The screen is divided into a menu frame 502, an options frame 504, a main frame 506, and a logo frame 508. The menu frame 502 provides the advisor with a plurality of different information screens. The options frame provides the advisor with further options and provides space for advertising, a stock ticker, and the like. The main frame is used to present information to the user. The logo frame 508 typically includes the logo of the brokerage for which the advisor works.

The menu frame is divided into subsections, each of which corresponds to the type of information it contains. A first section 502a relates to information between the advisor and the clients. A second section 502b relates to information between the brokerage and the clients. A third section 502c relates to information between the advisor and the brokerage. A fourth section 502d relates to information for the advisor only.

An example of the type of information provided in each section is described as follows. The first section 502a includes information about the advisor, newsletters, market trends, investment tips, and the like.

The second section 502b includes general information such as information about the brokerage, available products and services, market updates, new issues, economic indicators, currency exchange rates, investment calculators, mutual fund guides, newsletters, and the like.

The third section 502c includes information for the advisor such as daily updates, investment tips, upgrades and downgrades, new issues, recommended lists, restricted lists, economic indicators, research, mutual fund guides and the like.

The fourth section 502d includes personal information for the advisor such as portfolio tracking, stock watches, favorite stocks, client statistics and sales reports, and the advisor's preferences including type of alert, research and news interests and the like.

Two of the options available to the advisor in the options frame 504 are a "what's new" option and a "create" option. The "what's new" option presents to the advisor any new or unread items. Typically the "what's new" option will be presented as a default to the advisor upon logging in.

The "create" option provides the advisor with a submenu. Referring to FIG. 5, the submenu is represented generally by the numeral 506. The submenu has several options including creating new clients, organizing clients in groups, selecting top stock or mutual fund choices, organizing date-related events, initiating discussions, creating bulletins, adding reminders, recommending web sites to clients, creating content for the first section 502a of the web page, and the like.

Figure 6:
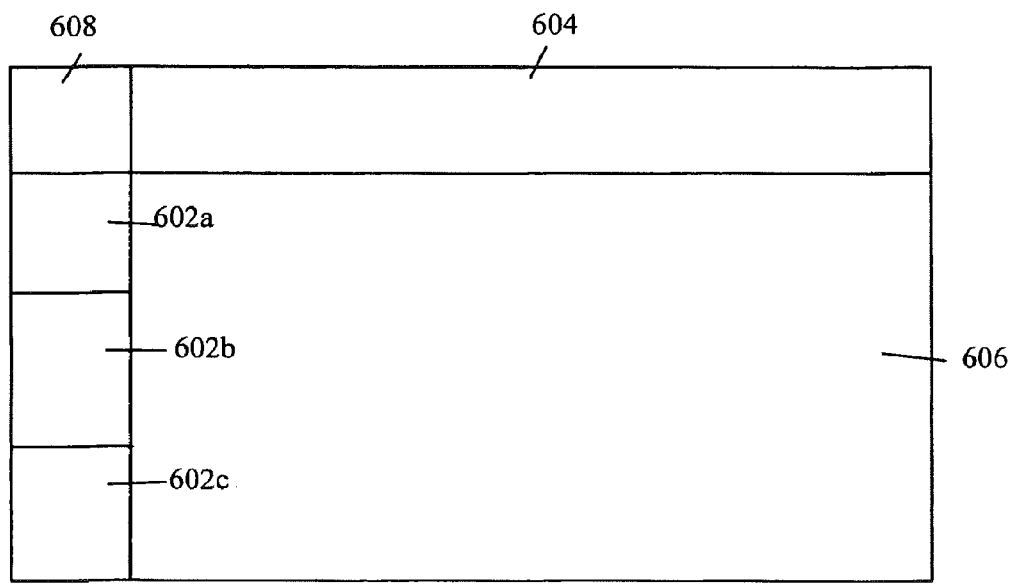
FIG. 6 is a block diagram of a client graphical user interface.

Similar to the advisor, the client navigates to a web site provided by the system and logs in. Upon logging in, the client is presented with a web page. Referring to FIG. 6, a block drawing representing the web page is illustrated generally by the numeral 600. The web page is displayed in a frames format, wherein different portions of a screen contain different web pages. The screen is divided into a menu frame 602, an options frame 604, a main frame 606, and a logo frame 608. The menu frame 602 provides the client with a plurality of different information screens. The options frame provides the client with further options and provides space for advertising, a stock ticker, and the like. The main frame is used to present information to the client. The logo frame 508 typically includes the logo of the brokerage providing the service to the client.

The menu frame is divided into subsections, each of which corresponds to the type of information it contains. A first section 602a relates to information between the advisor and the clients. A second section 602b relates to information between the brokerage and the clients. A third section 602c relates to information for the client only.

Sections 602a and 602b contain the same information as sections 502a and 502b described above. Section 602c includes information regarding the setting of alerts, determining which stocks to watch, customizing services provided by the advisor (including areas of interest), customizing research, editing favorite links, managing a personal financial portfolio (including funds held outside of the brokerage) and the like.

The client is also provided with the "what's new" and "create" options as described above. Furthermore, the client is provided with an "execute trade" option and a "customize services" option. Typically, the "What's New" option will be presented as a default to the client upon logging in.

The "customize services" option allows the client to customize the services provided by the system and the advisor. The client selects how quickly he or she is to be alerted once his or her advisor or the firm. Alternately, the advisor can set up the system such that the data feeds 412 are provided to the client. The client may select to be alerted either immediately, after a certain amount of delay, or at certain time intervals. The client also has the option of determining how the alerts will be sent. The alerts may be sent either via a pop-up box (or window), email, facsimile, telephone, or other wireless devices. Furthermore, the client is able to subscribe to a particular industry of interest by selecting an industry group.

The "execute trade" option allows the client to trade online. This option provides an interface with an on-line trading engine. The details of the trade will depend on the particular on-line trading engine used and is known in the art.

Figure 7:
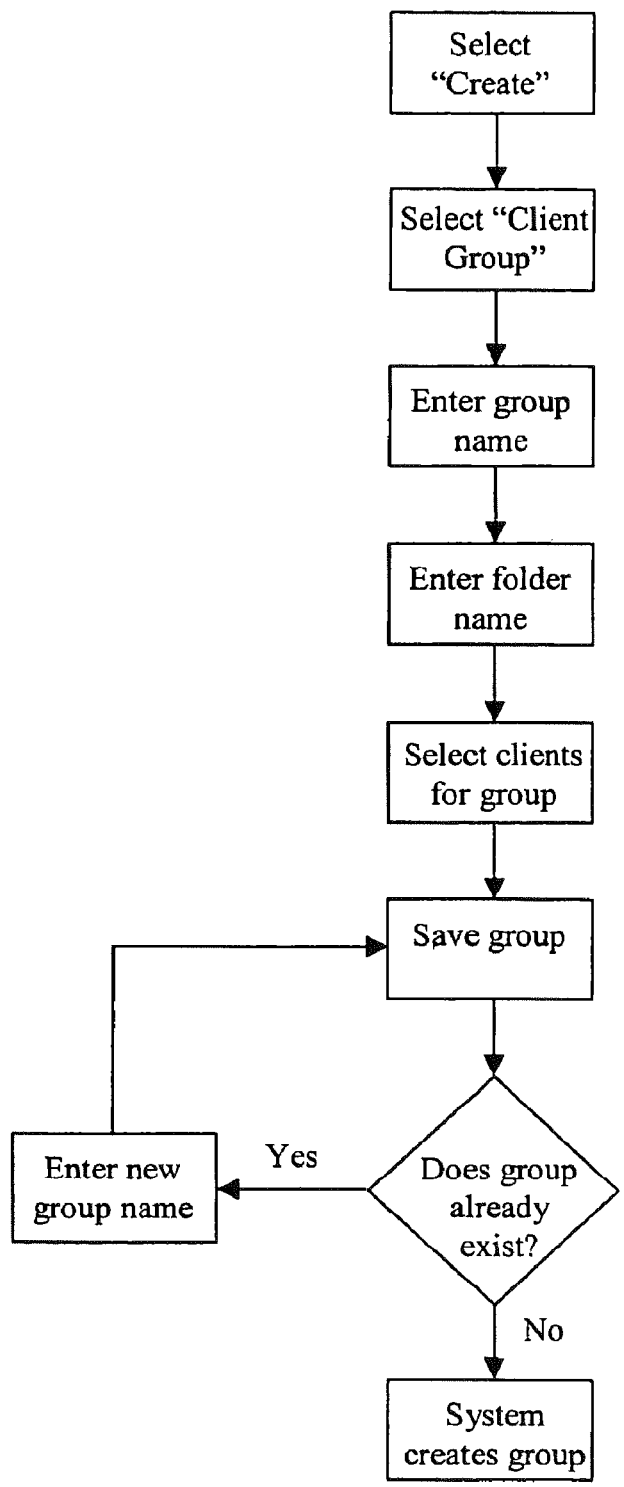
FIGS. 7-14 are flow charts illustration the functionality of the system.

The functionality of the system will now be described with reference to FIGS. 7 through 13. Referring to FIG. 7, a flowchart illustrating the process by which an advisor creates a client group is shown. The advisor selects the "create" option from the options frame and the "create" submenu is presented to the advisor. The advisor selects a "Client Group" option and is presented with a form for entering group information.

The advisor enters information such as a name of the group and a name to appear as a folder on the client desktop. The folder name and group name may be the same. The advisor selects the desired clients from a list of client names and the clients are added to the group. Further, the advisor may select an existing group to add to the group that is being created, in which case all the clients in the existing group are added to the new group.

If the advisor does not already have a group with the selected group name, then the group is created and saved by the system. Otherwise, the advisor will be prompted to enter a different name and the group will be created accordingly by the system.

Figure 8:
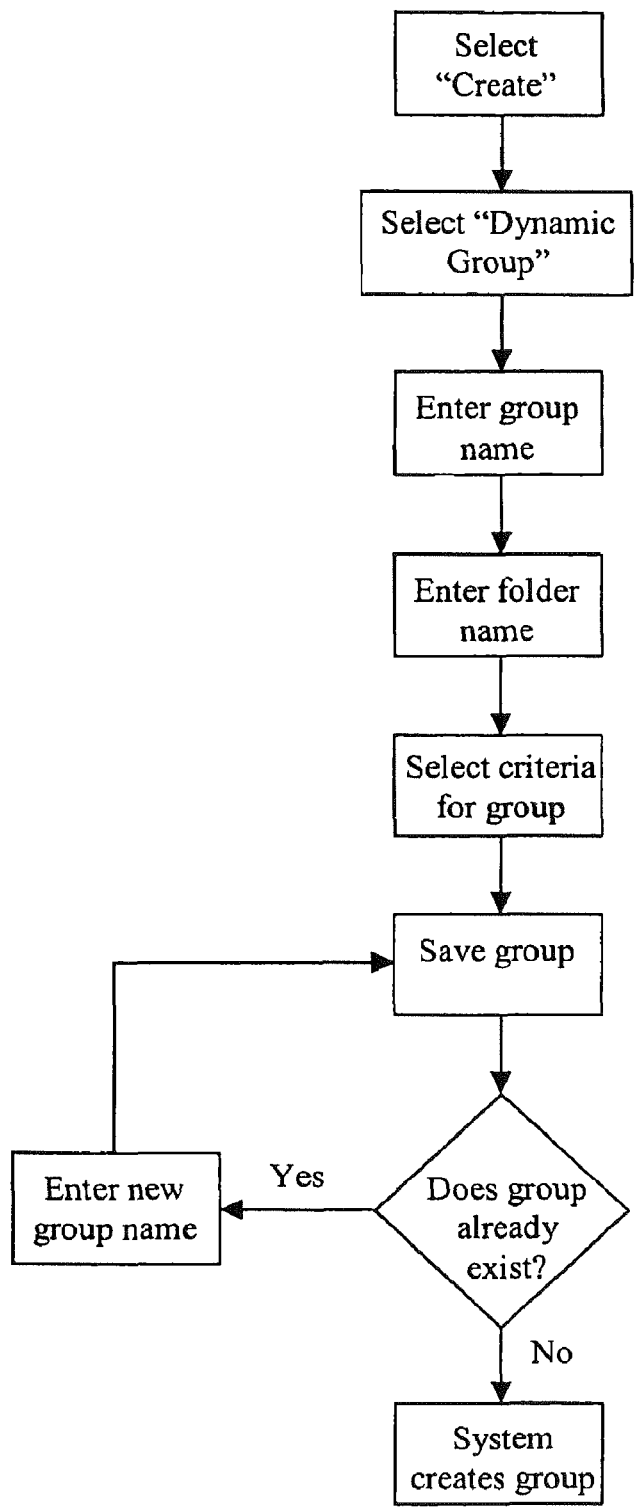

Referring to FIG. 8, the process with which an advisor can create a dynamic group is illustrated. A dynamic group differs from the typical group in that rather than associating specific clients to a group, the advisor can associate client characteristics to a group. These characteristics include the client's net worth, the client's age, the client's investment status, the client's cash on hand, and the like.

The advisor selects the "create" option from the options frame, which presents the "create" submenu. The advisor selects a "Dynamic Group" option from the submenu and is provided with a form for entering the group information. The group information includes the group name and the specific criteria for forming the group and this information is saved.

The advisor can then select this group in the same manner as any group having fixed clients. When the advisor selects the group, the system searches through all of the advisor's current clients and adds each of the clients meeting the criteria to the list of recipients. Therefore, the group changes dynamically for each message sent by the advisor.

Figure 9:
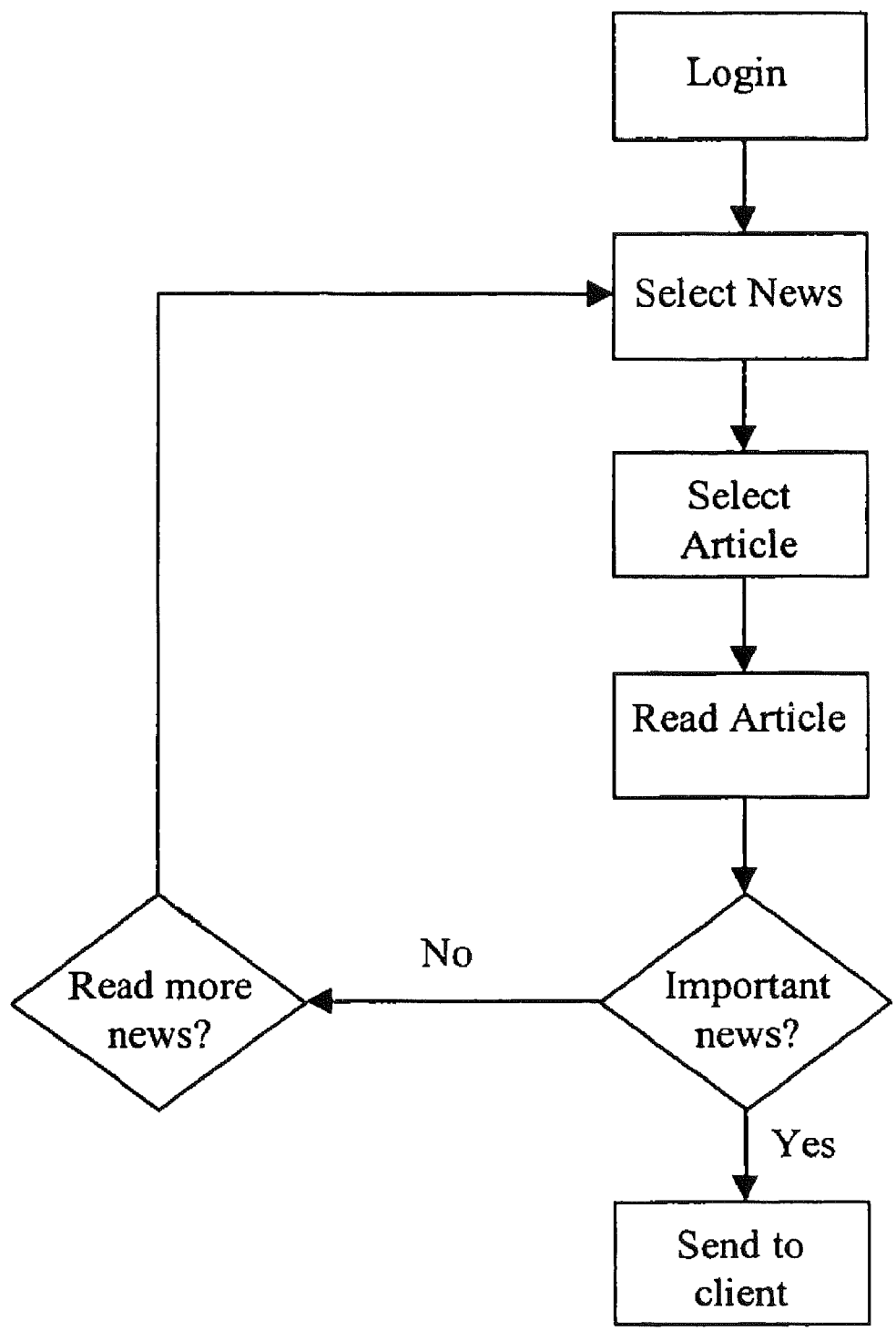

The advisor can view information and forward it to specific clients as desired. The flowchart illustrated in FIG. 9 illustrates the steps taken by an advisor in order to forward information to a client. In this particular example the information is a news item. After logging in, the advisor is presented with the advisor interface. The advisor selects a "headline news" option. The "headline news" options presents the advisor with a list of current news headlines. The advisor selects a particular headline and the corresponding news article is presented in the main frame. The advisor determines whether or not the news is relevant or important to any clients. If the news is irrelevant to any of the advisor's clients, the advisor has the option of reading more news or performing another function.

If the advisor wishes to read more news, the advisor reselects "headline news" and begins the review process again. If the advisor believes that some clients will find the news relevant or important, the advisor can send the news item to these clients. The advisor clicks a button associated with the news item entitled "Send to Clients" which enables the advisor to forward the news item to selected clients. The advisor selects the appropriate client group or groups to receive the news item.

Further, the advisor can also select individuals who are not part of the aforementioned groups and who the advisor believes are interested in reading the news item. If an individual recipient is selected that is already part of a group that was selected, the system, will only send the information once to that intended recipient. The advisor forwards the news item to the selected clients by selecting a "send" option.

Figure 10:
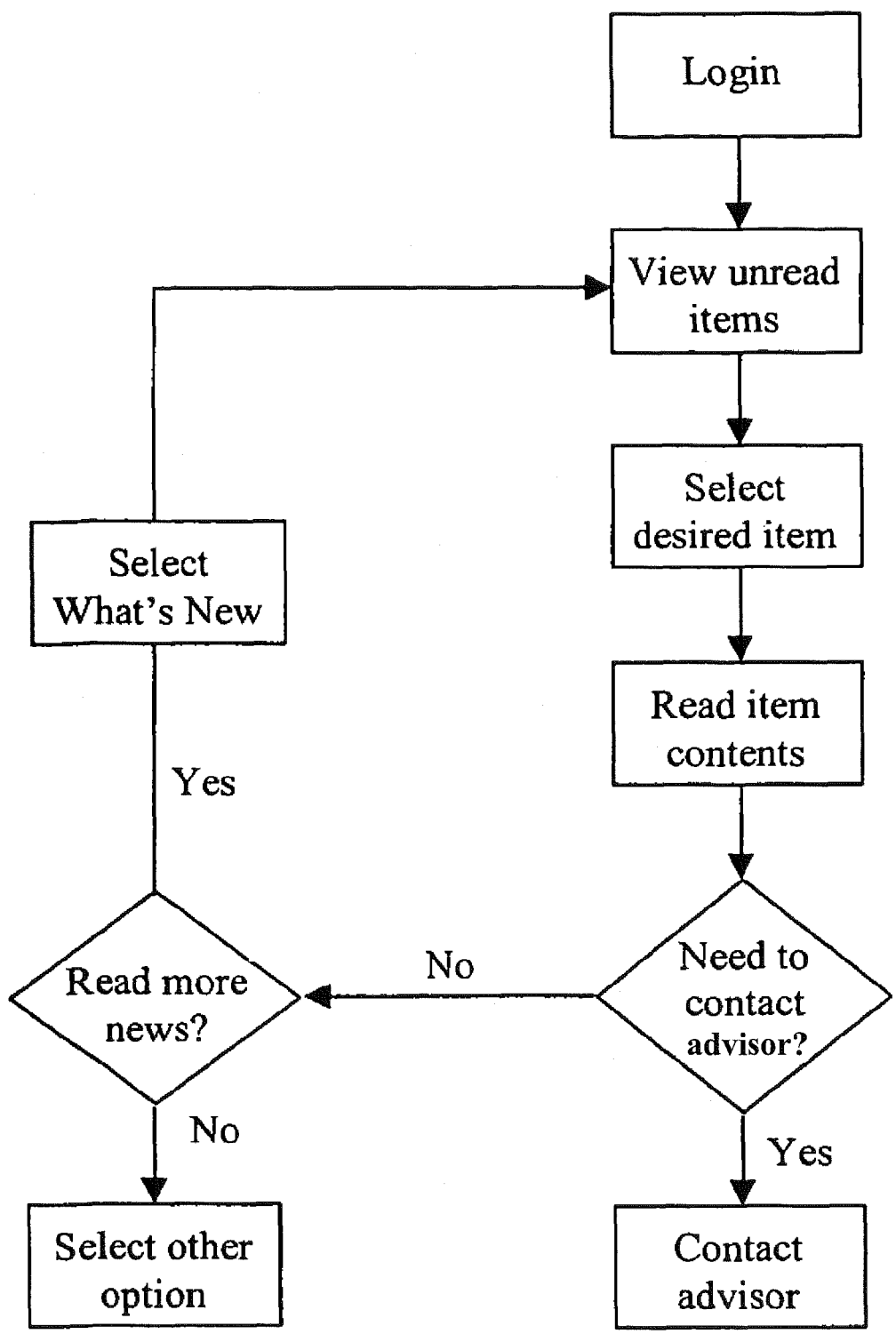

Referring now to FIG. 10, a flowchart illustrating a typical process that a client undertakes in order to review an information item forwarded by the advisor is shown. Once again, the information item in this example is a news item. Upon logging in, the client is presented with the client interface, which includes any new or unread items. The client selects a particular item to read by clicking on its headline. The corresponding article is presented to the client to read. Once the client has read the news item, the item is automatically organized and saved in a folder for the client.

The name of the folder where the news item is stored for the client is determined by the folder name selected by the advisor while setting up the group. Typically, the folder name will correspond to the type of information in the news item, which is determined by the user group to which the news item is forwarded by the advisor. For example, if the news item relates to an increase in oil prices, the advisor would typically forward such information to a group that the advisor created called "Oil and Gas". The Oil and Gas group contains all the clients interested in events related to oil and gas. Once those clients review the news item it is stored in a folder called "Oil and Gas" and can be retrieved at a later time.

The client can then decide whether or not it is beneficial, based on the news item, to contact the advisor. If the client does not feel it is beneficial to contact the advisor, the client can read other unread or new news items by selecting the "What's New" option. This option returns the client to the screen that displays any new or unread news items. If, however, the client does not want to read more new or unread news items, the client can log out of the system or select another menu button as desired.

Figure 11:
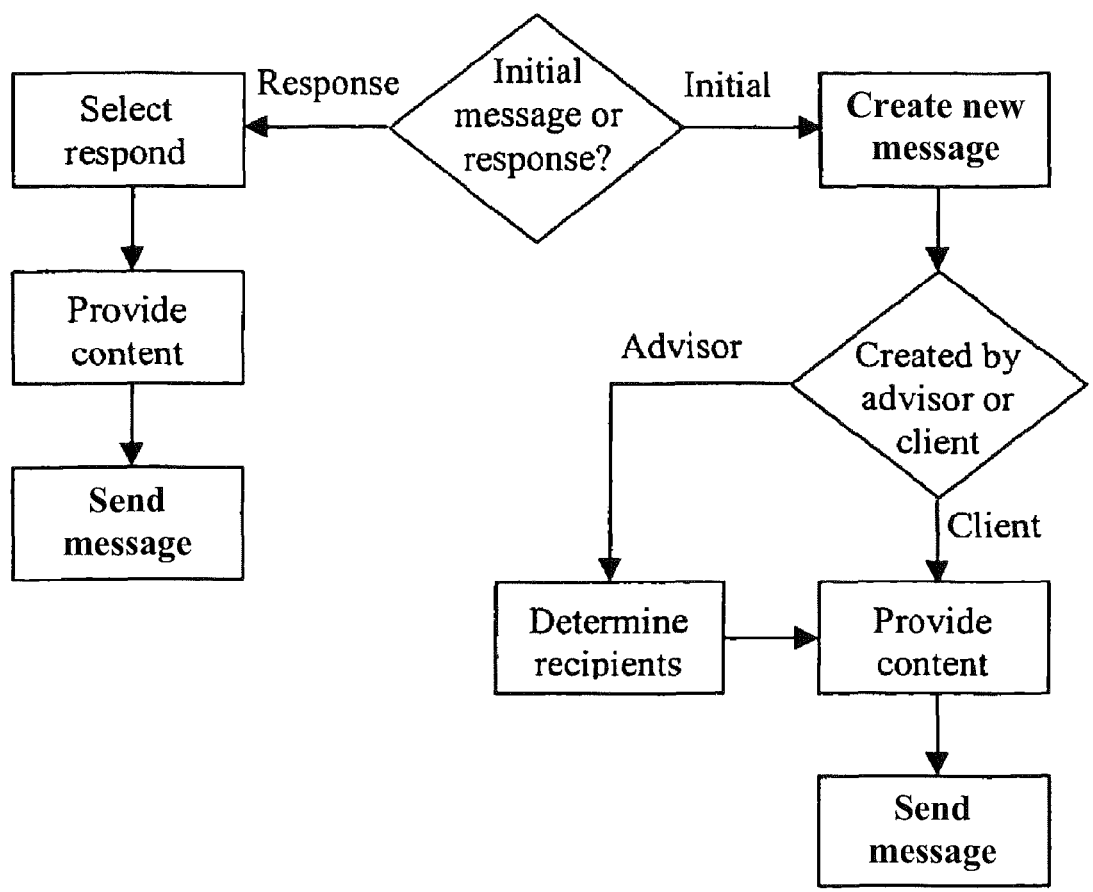

If the client does indeed feel it is beneficial to contact the advisor, the client may do so using a telephone or by sending or responding to an on-line message. Referring to FIG. 11, a flowchart illustrating the process for sending an on-line message is shown. The client selects the "create" option on the menu. This action provides the client with the "create" submenu. The client creates a new message by selecting the "discussion" option from the submenu. The client is provided with a form for inputting information such as the subject matter of the message, the message itself a list of possible attachments, and the like. Once the message is complete, the client clicks "Send" to send it to the advisor.

Figure 12:
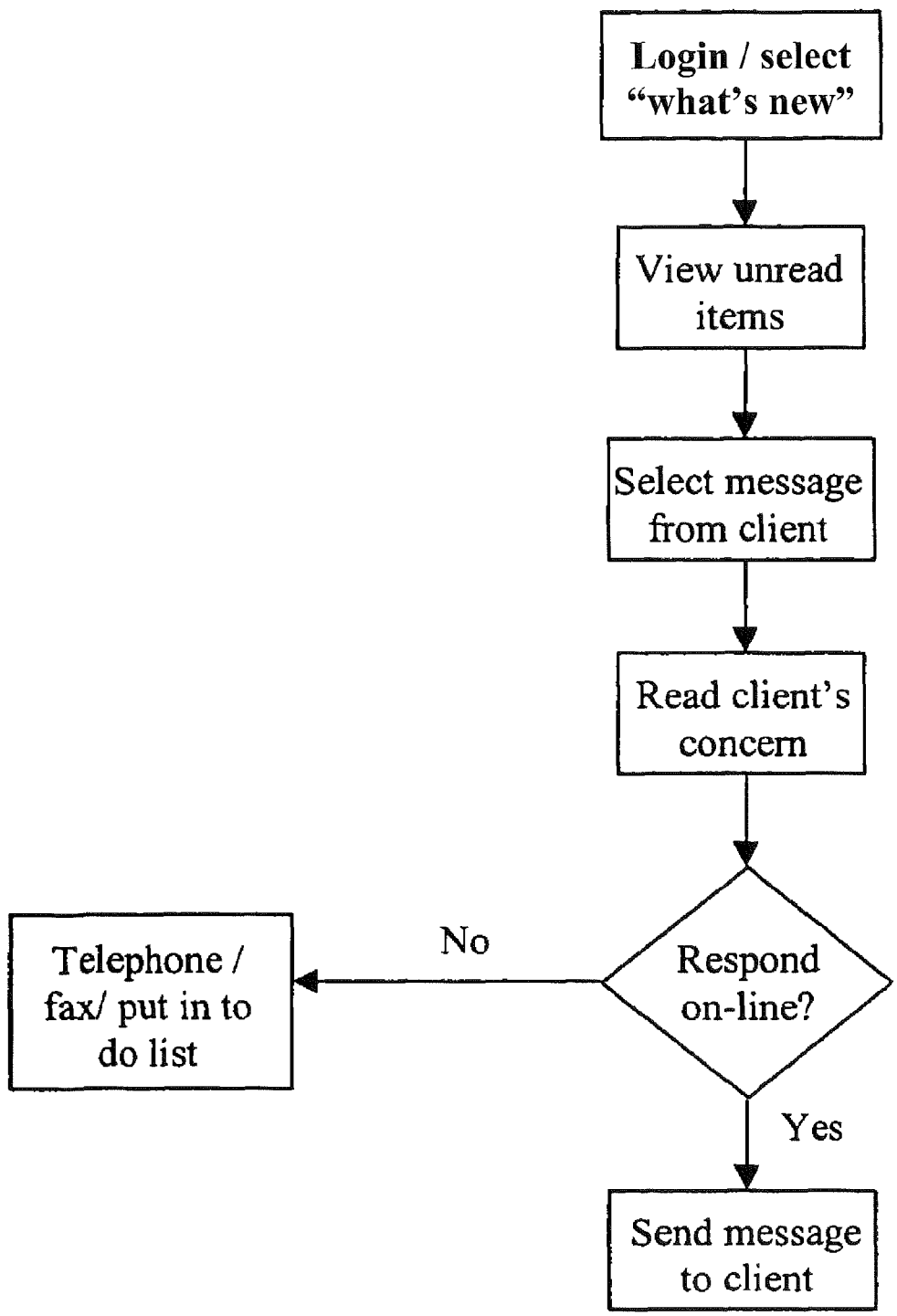

Referring to FIG. 12, the flowchart is shown illustrating the process the advisor follows in responding to a client's on-line message. When the advisor views any new information, either by logging on or by selecting the "what's new" option from the options frame, the advisor is presented with a list of unread items. Among these items is the unread message from the client. The advisor selects the unread message and reads the client's comments regarding the news story. The advisor may choose to respond to the client either, using the telephone or responding on-line, or to create a reminder item to remind himself or herself to contact that particular client at a later time.

Referring once again to FIG. 11, the advisor responds to the client's message by clicking the respond button on the message. The advisor provides the message content in response to the client's concern or comment, and then sends the message.

The above mentioned messaging functionality is similar to the functionality provided by typical e-mail systems. However, the messaging system is integrated into the overall system and neither the client nor the advisor needs to use an additional piece of software. Further, the client does not need to remember any e-mail addresses since whenever a new message is created it is automatically sent to the advisor since the client is not aware of the existence of any other clients. Unlike e-mail, all communication is facilitated through the secure servers and not the public Internet, maintaining confidentiality.

The distribution of e-mail by the advisor is similar to the distribution of news. The advisor is presented with a list of groups that has been created by the advisor or the brokerage. The list further includes the advisor's client names. The client's names may be associated with a corresponding client e-mail, or with the client's address in the system. The advisor determines the recipients of the e-mail by selecting client or groups of clients from the list. This messaging system is particularly useful for allowing the clients to select one or more of a plurality of different ways to be contacted by the advisor. The client may be contacted either by e-mail, telephone, facsimile, pop-up window, or wireless device.

Further, the system automatically organizes and stores the on-line messages in appropriate focus. For example, all the messages from a client to an advisor will be automatically stored for the advisor in a corresponding client file. Therefore, if an advisor would like to review an on-line message previously received from a client that the advisor had already read, the advisor would go to the folder associated with that particular client. The associated folder would be named in such a manner that it can uniquely identify the particular client. Such identifiers include the client's name, a file number, a telephone number, and the like. If a communication contains multiple discussion items sent back-and-forth between the advisor and the client, each item will be listed in a thread underneath the initial discussion item.

At the client side, all on-line messages sent to the client from the advisor are stored in a folder associated with the advisor. Typically the folder will have a title such as "Messages from My Advisor".

Figure 13:
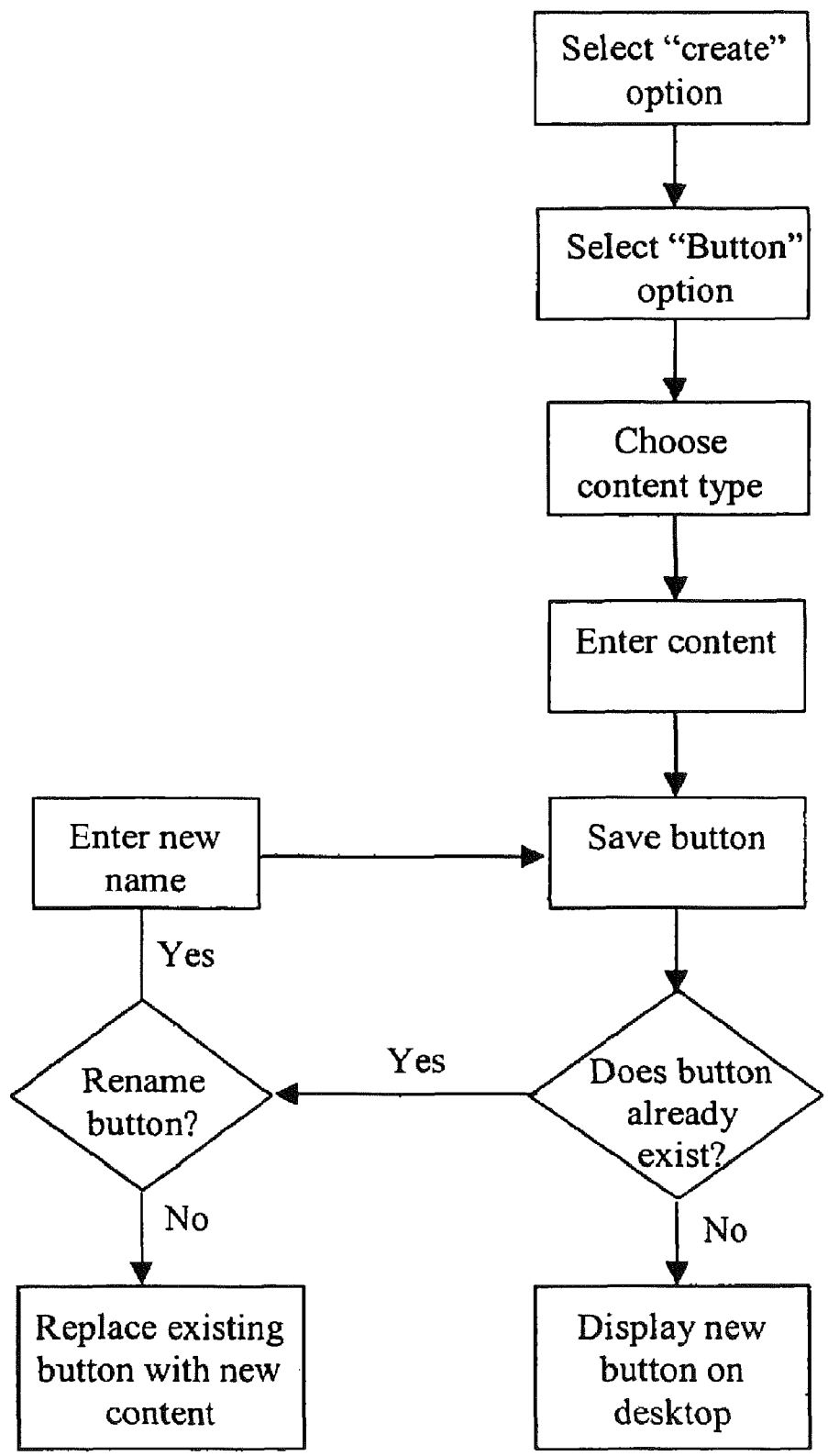

Referring to FIG. 13, the advisor has the further option to create a menu button that will be located in the first section of the menu frame that is dedicated to information transfer between the advisor and the client. The advisor selects the "create" option selects a "button" option from the "create" submenu. The advisor is provided with a form for entering the button information. The button information includes a name for the button, a content type to be associated with the button, and specific content of a predetermined type. The content type includes Internet addresses such as unique resource locator (URL) links, as well as files or text.

The advisor saves the created button. If the button name does not already exist then the system creates the button and the new button is displayed to the client in the menu upon log-in. If the button name does exist then the user is prompted to either to change the name of the button or to overwrite the existing button. If the advisor changes the name of the button to another name, which does not exist, then the new button is created and will appear on the client's desktop upon log-in. If the new name does exist, the advisor will again be prompted to either rename the button or to replace the existing button. This will continue until the button is created or the user aborts the process.

If a URL link is selected as the content type, the advisor enters the URL link as the content of the predetermined type. When the client clicks on the button associated with the URL link, the web page associated with the particular URL link is presented to the user in the main frame.

If the content type is a file, the name and location of the file is entered into the content of predetermined type. When the client selects the button, the associated file, such as an Adobe™ PDF file, will be presented to the client in the main frame.

If the content type is text, then the actual text that the advisor wishes the client to view is entered into the content of the predetermined type section. When the client selects the button, the text entered by the advisor will be displayed to the client in the main frame. Other content types will be apparent to a person skilled in the art.

In alternate embodiments, the hierarchical system is greater than the three-tier system described in the previous embodiment. An additional level can be added between the advisors and the brokerage. This level can be assigned to managers who are responsible for a plurality of advisors.

Alternately, an additional level could be added on top of the brokerage. A large investment group can provide its services to a plurality of brokerages. In such an embodiment, the investment group provides its information to the brokerages that, in turn, provides the information to the advisors and clients.

Alternately, an additional step could be inserted into the process of sending an item from an advisor to a client, in which a designated third user may read the item before it reaches the client and may release it to the client after acknowledging it as acceptable communication. The third user is typically a Compliance Officer of the firm.

Figure 14:
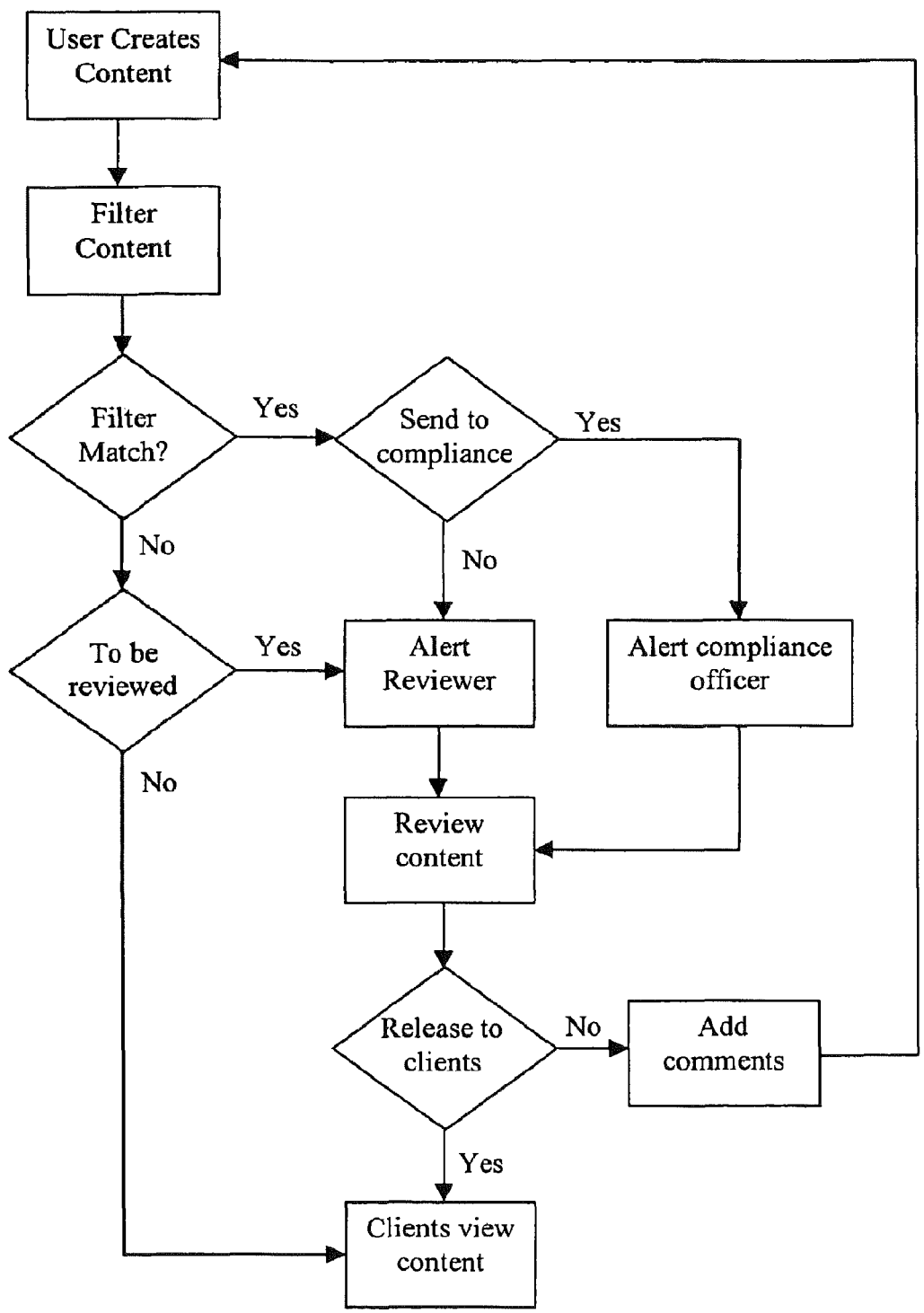

Referring to FIG. 14, a flowchart illustrating a sample compliance procedure is shown. Before the firm or the advisor (referred to as the sender) sends information to the clients, the information is passed through a firm maintained filter. The filter is typically maintained by the firm's compliance department and is used to automatically search for keywords that might present a problem. If the filter detects no problem, the information is passed to a switch for determining if it is to be reviewed.

The switch is defined for the sender based on the required compliance mode. If the compliance mode does not require information to be reviewed, it is marked as such and sent to the desired destination, which is typically the client. If the compliance mode does require the information to be reviewed, a reviewer is alerted.

The reviewer examines the information to ensure it is approved before sending it to the client. If the examiner approves the information, it is marked as such and released to the client. If the examiner does not approve the information, comments as to why the information has been disapproved are added, and the information is returned to the sender. Further, once information has been either approved or disapproved, a message indicating the status of the information is sent to the sender.

If, however, the information does match the criteria established by the filter, the filter uses the matching criteria to determine whether the information is to be sent to a compliance officer or the reviewer. If the information is sent to a reviewer, it follows the same procedure as described above. If the information is sent to a compliance officer, the compliance officer follows the same procedure as the reviewer.

In yet an alternate embodiment, the invention is applied to communication between a company president and the company's stakeholders (such as employees, suppliers and shareholders). The president groups, and communicates with, stakeholders according to their role and the type of information that would be relevant to each of them. The stakeholders benefit from being able to easily manage issues such as product direction as communicated by the president, as well as news, research, quotes, policies and procedures, and company news from both the company and external sources. The information provided by the president is maintained in a portfolio, which benefits shareholders and suppliers by indicating their stake or accounts with the company. In yet an alternate embodiment, the invention is applied to communication between a holding company such as an incubator, the holding company's account representatives, and subsidiaries of the company, as overseen by the representatives. The account representatives group and communicate with subsidiaries according to various criteria. The subsidiary benefits by having a method of staying in constant contact with their account representative. They benefit greatly by being able to go to one place for specific business advice and information about market issues, further financing options, possible partnering opportunities and events like technology tradeshows, as distributed by the account representative and the holding company's marketing department.

In yet an alternate embodiment, the invention is applied to communication between an electricity company, its advisors/account representatives and large consumers of electricity. The consumers are looking for advice about how to keep energy costs as low as possible, so electricity companies are employing advisors to advise the consumers on keeping low costs and similar issues. The electricity company benefits from increased customer loyalty since the advisors are able to group and communicate with customers to disseminate information that is relevant to each customer, such as specific advice on how to decrease electricity usage in certain situations. Research and News are incorporated for allowing customers to learn of new developments in energy technology, and for further maintaining customer loyalty to the electricity company.

In yet an alternate embodiment, the invention is applied to communication between members of a trade organization, a facilitator/chair, and employees of the trade organization. The facilitator communicates with members according to status or geography, and relays information such as meeting minutes and agendas, policy agreements, new ideas, and copies of presentations. The organization employees and members communicate directly about issues such as membership dues, extracurricular activities and the like.

In yet an alternate embodiment, the invention is applied to communication between an insurance firm, its agents, and its clients. The clients seek advice as to how to best manage their insurance policies. The insurance agent communicates with clients individually, or via topic groups targeting information about new laws, policy changes, and costs. The firm communicates with clients about claims, billing, special offers and surveys.

Therefore, it is shown that the system and methods described herein have application in a plurality of circumstances. In general, the system can be implemented for a situation where there is need for a communication system between an organization, the organization's experts or facilitators, and a number of clients, customers or colleagues. The organization typically seeks to achieve customer loyalty by providing the expert/facilitators' expertise and effort to maintain or better the client's business, financial or personal situation.

The terms and expressions which have been employed in the specification are used as terms of description and not of limitations, there is no intention in the use of such terms and expressions to exclude any equivalents of the features shown and described or portions thereof, but it is recognized that various modifications are possible within the scope of the claims to the invention.

What is claimed is:

1. A method for managing at least one collaborative online space over a network, comprising:
   providing over the network a group creation template with which primary users can interact over the network to create one or more collaborative online spaces, wherein the spaces are configured to provide a plurality of online activities to users of the spaces;
   storing information received from user interaction with the group creation template, wherein the information represents one or more groups of secondary users for a particular collaborative online space including a name for a group and a corresponding access level to the collaborative online space for each group or secondary user;
   creating the collaborative online space in accordance with user interaction with the collaborative online space template and the stored access levels, wherein the online space; and
   providing the group access to the created collaborative space.

2. The method of claim 1, wherein the plurality of online activities comprises use of an electronic bulletin board, chat room, calendar, contact database, change control, event planner, group discussion, issue management, project collaboration, presentation library, or a decision survey in a box.

3. The method of claim 1, further comprising:
   providing to a personal space owner, online access to a personal space that is configured to provide a plurality of views configured with electronic resources for or about the personal space owner, wherein the personal space owner is one of the primary or secondary users.

4. The method of claim 3, wherein the plurality of views comprises:
   a first view configured to provide the owner links to at least one of the collaborative online space to which the owner has access.

5. The method of claim 3, wherein the first view is further configured to provide:
   a communication interface for the owner to electronically communicate with at least one of the other primary users or secondary users.

6. The method of claim 3, wherein the plurality of view comprises:
   a second view configured to provide an external user at least one of (a) information about the personal space owner or (b) an electronic contact mechanism to communicate with the personal space owner.

7. The method of claim 3, wherein different views of the plurality of views restrict access to portions of the electronic resources based one different access levels of users requesting the access.

8. The method of claim 3, further comprising:
   providing to the personal space owner, an online interface that provides:
   the plurality of views configured with electronic resources for or about the personal space owner, and
   other views of personal spaces of different owners.

9. The method of claim 3, wherein the interface provides access to the other views via a user directory, wherein the user directory provides links to the other views of each user in the user directory.

10. The method of claim 3, wherein creating the collaborative online space in accordance with user interaction further comprises:
    creating an electronic link to the created collaborative online space in the electronic resources available to the personal space owner.

11. A system for managing at least one collaborative online space over a network, comprising a processor configured to perform the following steps:
    providing over the network a group creation template with which primary users can interact over the network to create one or more collaborative online spaces, wherein the spaces are configured to provide a plurality of online activities to users of the spaces;
    storing information received from user interaction with the group creation template, wherein the information represents one or more groups of secondary users for a particular collaborative online space including a name for a group and a corresponding access level to the collaborative online space for each group or secondary user;
    creating the collaborative online space in accordance with user interaction with the collaborative online space template and the stored access levels, wherein the online space; and
    providing the group access to the created collaborative space.

12. The system of claim 11, wherein the plurality of online activities comprises use of an electronic bulletin board, chat room, calendar, contact database, change control, event planner, group discussion, issue management, project collaboration, presentation library, or a decision survey in a box.

13. The system of claim 11, wherein the steps further comprise:
    providing to a personal space owner, online access to a personal space that is configured to provide a plurality of views configured with electronic resources for or about the personal space owner, wherein the personal space owner is one of the primary or secondary users, wherein the plurality of views comprises:
- a first view configured to provide the owner links to at least one of the collaborative online space to which the owner has access; and
- a second view configured to provide an external user information about the personal space owner and a contact mechanism to the personal space owner, wherein different views of the plurality of views restrict access to portions of the electronic resources based one different access levels of users requesting the access.

14. The system of claim 13, wherein the steps further comprises:
providing to the personal space owner, an online interface that provides the plurality of views configured with electronic resources for or about the personal space owner, and other views of personal spaces of different owners, wherein the interface provides access to the other views via a user directory, wherein the user directory provides links to the other views of each user in the user directory.

15. The system of claim 13, wherein creating the collaborative online space in accordance with user interaction further comprises:
creating an electronic link to the created collaborative online space in the electronic resources available to the personal space owner.

16. A processor readable medium for managing at least one collaborative online space over a network, comprising processor executable instructions that when executed by a processor causes the processor to perform the following steps:
- providing over the network a group creation template with which primary users can interact over the network to create one or more collaborative online spaces, wherein the spaces are configured to provide a plurality of online activities to users of the spaces;
- storing information received from user interaction with the group creation template, wherein the information represents one or more groups of secondary users for a particular collaborative online space including a name for a group and a corresponding access level to the collaborative online space for each group or secondary user;
- creating the collaborative online space in accordance with user interaction with the collaborative online space template and the stored access levels, wherein the online space; and
- providing the group access to the created collaborative space.

17. The processor readable medium of claim 16, wherein the plurality of online activities comprises use of an electronic bulletin board, chat room, calendar, contact database, change control, event planner, group discussion, issue management, project collaboration, presentation library, or a decision survey in a box.

18. The processor readable medium of claim 16, wherein the steps further comprise:
providing to a personal space owner, online access to a personal space that is configured to provide a plurality of views configured with electronic resources for or about the personal space owner, wherein the personal space owner is one of the primary or secondary users, wherein the plurality of views comprises:
- a first view configured to provide the owner links to at least one of the collaborative online space to which the owner has access; and
- a second view configured to provide an external user information about the personal space owner and a contact mechanism to the personal space owner, wherein different views of the plurality of views restrict access to portions of the electronic resources based one different access levels of users requesting the access.

19. The processor readable medium of claim 18, wherein the steps further comprises:
providing to the personal space owner, an online interface that provides the plurality of views configured with electronic resources for or about the personal space owner, and other views of personal spaces of different owners, wherein the interface provides access to the other views via a user directory, wherein the user directory provides links to the other views of each user in the user directory.

20. The system of claim 18, wherein creating the collaborative online space in accordance with user interaction further comprises:
creating an electronic link to the created collaborative online space in the electronic resources available to the personal space owner.

* * * * *